United States Patent
Morimoto et al.

(10) Patent No.: US 6,373,265 B1
(45) Date of Patent: Apr. 16, 2002

(54) ELECTROSTATIC CAPACITIVE TOUCH SENSOR

(75) Inventors: Hideo Morimoto, Gojo; Kazuhiro Okada, Omiya, both of (JP)

(73) Assignees: Nitta Corporation, Osaka; Wacoh Corporation, Saitama, both of (JP)

( * ) Notice: Subject to any disclaimer, the term of this patent is extended or adjusted under 35 U.S.C. 154(b) by 0 days.

(21) Appl. No.: 09/497,065

(22) Filed: Feb. 2, 2000

(30) Foreign Application Priority Data

Feb. 2, 1999 (JP) .......................................... 11-025128
Jul. 13, 1999 (JP) .......................................... 11-198645
Sep. 1, 1999 (JP) .......................................... 11-247476

(51) Int. Cl.[7] .............................................. G01R 27/26
(52) U.S. Cl. ...................................... 324/686; 324/661
(58) Field of Search ................................ 324/519, 686, 324/658, 660, 661, 662; 73/514.32

(56) References Cited

U.S. PATENT DOCUMENTS 5,431,050 A * 7/1995 Yamada .................... 73/514.32
5,528,937 A * 6/1996 Dufour ..................... 73/514.32

FOREIGN PATENT DOCUMENTS

JP       H7-200164       8/1995

* cited by examiner

Primary Examiner—Safet Metjahic
Assistant Examiner—Vincent Q. Nguyen
(74) Attorney, Agent, or Firm—Koda & Androlia

(57) ABSTRACT

An electrostatic capacitive touch sensor including a substrate having a group of fixed electrodes formed thereon; and a movable electrode plate that is integrally molded by using rubber or resin having an elastic property as a whole and that has at least a face which opposes the group of fixed electrodes and is made of a conductive rubber or a conductive resin. The group of fixed electrodes and the movable electrode plate form a plurality of variable electrostatic capacitive sections, and in response to the magnitude and the direction of a force applied onto the movable electrode plate, the electrostatic capacitances of the respective variable electrostatic capacitive sections are allowed to change.

28 Claims, 25 Drawing Sheets

ELECTROSTATIC CAPACITIVE TOUCH SENSOR

BACKGROUND OF THE INVENTION

1. Field of the Invention

The present invention relates to an electrostatic capacitive touch sensor.

2. Prior Art

For example, as illustrated in FIG. 25, a conventional electrostatic capacitive touch sensor typically has a construction in which a substrate 90 having fixed electrodes Dx+, Dx−, Dy+ and Dy− and a dish-shaped metal diaphragm 91 having a conductive property with an operation shaft 91a are formed into an integral part by a rivet 92. In the touch sensor of this type, when the operation shaft 91a is tilted, the metal diaphragm 91 is distorted, with the result that the electrostatic capacitance between the metal diaphragm 91 and the fixed electrodes Dx+, Dx−, Dy+ and Dy− are allowed to change.

However, the conventional electrostatic capacitive touch sensor described above has the following problems:

Troublesome assembling tasks, such as a joining process (caulking process, etc.) between the metal diaphragm 91 and the operation shaft 91 and a riveting process between the metal diaphragm 91 and the substrate 90 are required, resulting in high costs.

Water, etc. tend to enter the gap between the metal diaphragm 91 and the substrate 90; therefore, an additional sealing member is required so as to make the device water-proof, depending on applications.

SUMMARY OF THE INVENTION

Therefore, one object of the present invention is to provide an electrostatic capacitive touch sensor which makes it possible to reduce the number of troublesome assembling processes and to easily make the device water-proof and dust-proof without increasing the number of parts.

Another object of the present invention is to provide an electrostatic capacitive touch sensor which makes it possible to reduce the number of troublesome assembling processes, to easily make the device water-proof and dust-proof without increasing the number of parts, and to provide a high sensitivity as a sensor.

The touch sensor according to the present invention comprises:

a substrate having a group of fixed electrodes formed thereon, and a movable electrode plate that is integrally molded by using rubber or resin having an elastic property as a whole and has at least a face which opposes the group of fixed electrodes and is made of a conductive rubber or a conductive resin.

In this arrangement, a plurality of variable electrostatic capacitive sections are formed by the group of fixed electrodes and movable electrode plate so that, in response to the magnitude and the direction of a force applied onto the movable electrode plate, the electrostatic capacitances of the respective variable electrostatic capacitive sections are allowed to change.

The touch sensor according to the present invention comprises:

a substrate having a group of fixed electrodes formed thereon, and a movable electrode plate that is integrally molded by using elastomer as a whole and has at least a face which opposes the group of fixed electrodes and is made of a conductive elastomer.

In this arrangement, a plurality of variable electrostatic capacitive sections are formed by the group of fixed electrodes and the movable electrode plate so that, in response to the magnitude and the direction of a force applied onto the movable electrode plate, the electrostatic capacitances of the respective variable electrostatic capacitive sections are allowed to change.

Furthermore, the touch sensor according to the present invention comprises:

a substrate having a group of fixed electrodes formed thereon, a movable electrode plate which is formed by using elastomer as a whole and has at least a face which opposes the group of fixed electrodes and is made of a conductive elastomer, and an operation portion made of a hard material, which is formed integrally with or separately from the movable electrode plate and can transmit force to the movable electrode plate.

In this arrangement, a plurality of variable electrostatic capacitive sections are formed by the group of fixed electrodes and movable electrode plate so that, in response to the magnitude and the direction of a force applied onto the operation portion, the electrostatic capacitances of the respective variable electrostatic capacitive sections are allowed to change.

The present invention, may have a construction in which an operation portion, made of rubber or resin, having a protruding shape, is integrally formed on the movable electrode plate.

In addition an operation portion which is made of elastomer and has a protruding shape, may be integrally formed on the movable electrode plate.

Furthermore, in the present invention, the electrodes of the group of fixed electrodes may be arranged so as to have an interval of 180° from each other; thus, based upon a change in the electrostatic capacitances between the two variable electrostatic capacitive sections, it is possible to detect the magnitude in the X-axis direction of a force applied onto the operation portion together with its positive or negative direction.

The electrodes of the group of fixed electrodes may be arranged so as to have an interval of 90° with each other; thus, based upon a change in the electrostatic capacitances between the two variable electrostatic capacitive sections that face each other on one straight line, it is possible to detect the magnitude in the X-axis direction of a force applied onto the operation portion together with its positive or negative direction, and based upon a change in the electrostatic capacitances between the two variable electrostatic capacitive sections that face each other on the other straight line, it is possible to detect the magnitude in the Y-axis direction of a force applied onto the operation portion together with its positive or negative direction.

Furthermore, an independent electrode may be formed on a substrate portion surrounded by four electrodes arranged with an interval of 90° with each other; thus, based upon a change in the electrostatic capacitance of the variable electrostatic capacitive section that is formed by the independent electrode and the variable electrode plate, it is possible to detect the magnitude in the Z-axis direction of a force applied onto the operation portion together with its positive or negative direction.

In addition, an independent contact-use land may be formed on the substrate portion surrounded by four electrodes arranged with an interval of 90° with each other, and a protrusion serving as an electrical contact may be formed on a portion of the movable electrode plate opposing the contact-use land; thus, the switch is constructed by the protrusion and the contact-use land.

Furthermore, in the present invention, a peripheral protruding portion may be formed on the movable electrode plate so as to surround the operation portion; therefore, when the movable electrode plate is attached to a fixing member with the peripheral protruding portion being pressed thereon, it is possible to ensure a sealing property between the fixing member and the movable electrode plate by the elastic restoration force of the peripheral protruding portion.

The substrate and the movable electrode plate may be enclosed by a metal frame, and one portion of the metal frame is bent over so that the movable electrode plate and the substrate are secured to the metal frame in a manner so as to be pressed thereon; thus, it becomes possible to prevent foreign matters from entering the variable electrostatic capacitive section from outside by using a sealing property exerted by the elastic restoration force of the movable electrode plate.

In the present invention, the metal frame has a conductive property so that the movable electrode plate is allowed to hold a predetermined voltage through the metal frame. Furthermore, a protrusion may be formed on at least either one of the opposing faces of the substrate and the movable electrode plate so as to prevent the gap between the group of fixed electrodes and the movable electrode plate from becoming too narrow the operation portion may be provided with a space, and the operation portion may be made of rubber, resin or metal.

DETAILED DESCRIPTION OF THE PREFERRED EMBODIMENTS

Embodiment 1

Figure 1:
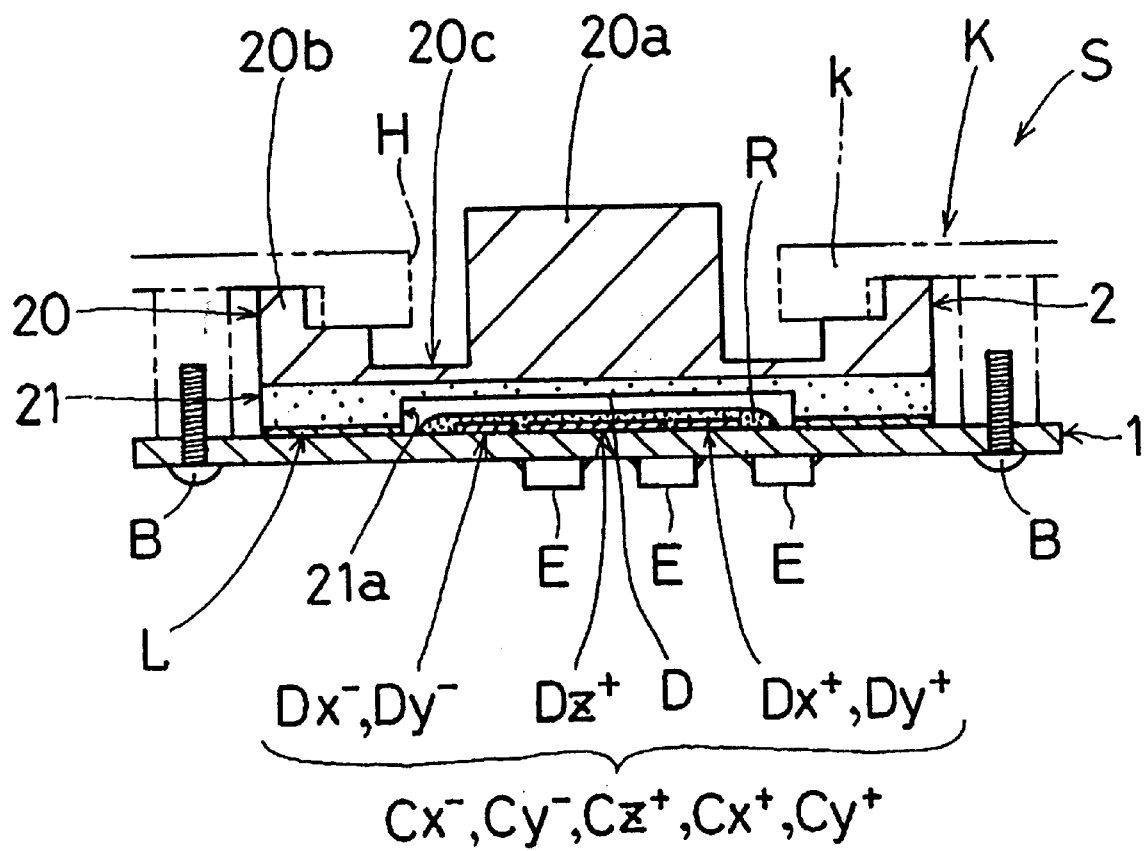
FIG. 1 is a cross-sectional view that shows an assembled state of an electrostatic capacitive touch sensor in accordance with Embodiment 1 of the present invention.

As illustrated in FIG. 1, the electrostatic capacitive touch sensor S is provided with a substrate 1 and a movable electrode plate 2 placed on the substrate 1, and as indicated by a two dots chain line of FIG. 1, these members are secured on the upper wall k of a casing K with machine screws B.

Figure 2:
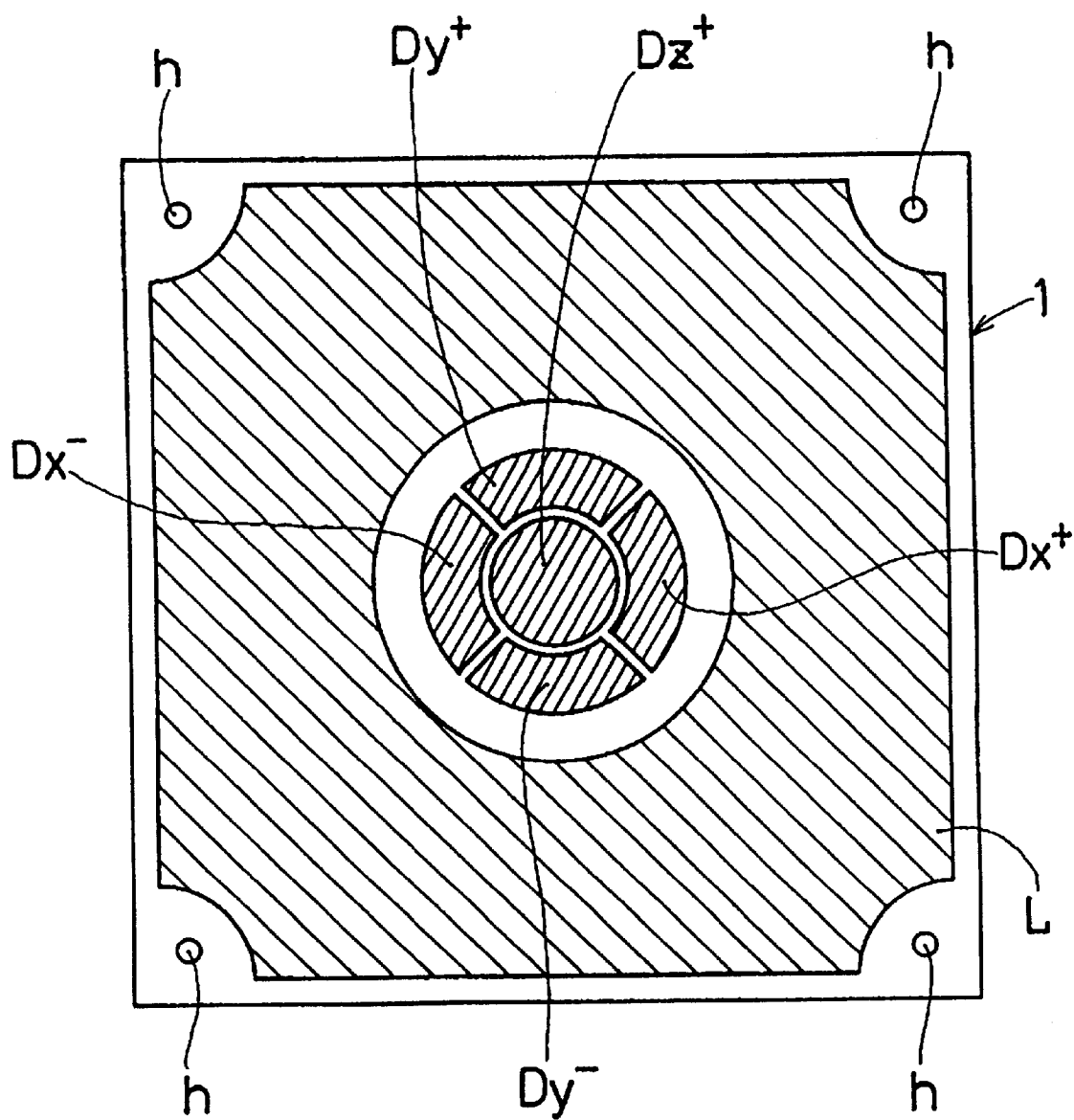
FIG. 2 is a plan view that shows the touch sensor and fixed electrodes.

As illustrated in FIGS. 1 and 2, a contact-use land L and fixed electrodes Dx+, Dx−, Dy+, Dy− and Dz+ covered with a resist film R are formed on a front face of the substrate 1, and an electronic part E used for electrostatic capacitance/voltage conversion is placed on its rear face. Moreover, penetration holes h through which the machine screws B are inserted are formed in its four corners. The fixed electrodes Dx+, Dx−, Dy+, Dy− and Dz+ are covered with the resist film R so as to prevent these electrodes from directly contacting a conductive rubber layer section 21 which will be described later.

As illustrated in FIG. 1, the movable electrode plate 2, as a whole, is integrally molded by using elastic rubber; and more specifically, it is constituted by a silicone rubber section 20 (which may be formed by resin) on the upper side thereof and a conductive rubber layer section 21 (which may be formed by resin) on the lower side thereof. With respect to the material of the movable electrode plate 2, any high polymer material (elastomer) that has high rubber elasticity in the vicinity of room temperature may be adopted; and examples thereof include closslinked natural rubber, synthetic rubber, thermoplastic urethane rubber, spandex, polycarbonate elastic resins, and sponge rubber.

As illustrated in FIG. 1, a short rod-shaped operation portion 20a is placed on the upper face of the silicone rubber section 20 so as to stick out therefrom; and a peripheral protruding portion 20b, which exerts a sealing property when pressed against the upper wall k, is placed on the periphery thereof. Moreover, a true-circle shaped diaphragm section 20c is formed between the operation portion 20 and the peripheral protruding portion 20b. The conductive rubber layer section 21, as illustrated in FIG. 1, is formed in the rear face thereof with a recessed section 21a which has a round shape when viewed from above with a size large enough to accommodate the fixed electrodes Dx+, Dx−, Dy+, Dy− and Dz+.

Here, the movable electrode plate 2 is designed to form a distortion-effecting body in which, when a force is applied onto the operation portion 20a, the stress is concentrated on the diaphragm section 20c, thereby causing a distortion therein. Thus, a portion of the conductive rubber layer section 21 facing the fixed electrodes is allowed to function as electrode D that forms variable electrostatic capacitive sections Cx+, Cx−, Cy+, Cy− and Cz+ in combination with the fixed electrodes Dx+, Dx−, Dy+, Dy− and Dz+, as will be described later.

In an attached state to the casing K as illustrated in FIG. 1, the electrostatic capacitive touch sensor S has the following functions:

Upon receipt of a pressing force from the upper wall k, the peripheral protruding portion 20b is elastically deformed so that the conductive rubber layer section 21 and the contact-use land L come into contact with each other, thereby preventing liquid, dust, etc. from entering the variable electrostatic capacitive sections Cx+, Cx−, Cy+, Cy− and Cz+ (that is, exerting a sealing property); and the rear face of the upper wall k also comes into contact with the peripheral protruding portion 20b, thereby preventing liquid, dust, etc. from entering a hole H formed in the upper wall k. In other words, the sensor S with this construction makes it possible to ensure the sealing properties at the respective portions without the need for installing a special plate-shaped sheet member.

The contact between the conductive rubber layer section 21 and the contact-use land L allows the entire conductive rubber layer section 21 of the movable electrode plate 2 to have the GND electric potential. Therefore, electric potential differences are provided between the contact-use land L and the fixed electrodes Dx+, Dx−, Dy+, Dy− and Dz+ so that the variable electrostatic capacitive sections Cx+, Cx−, Cy+, Cy− and Cz+ are exerted.

Additionally, the application of the sensor S makes it possible to eliminate troublesome assembling tasks described in the "Prior Art".

Figure 3:
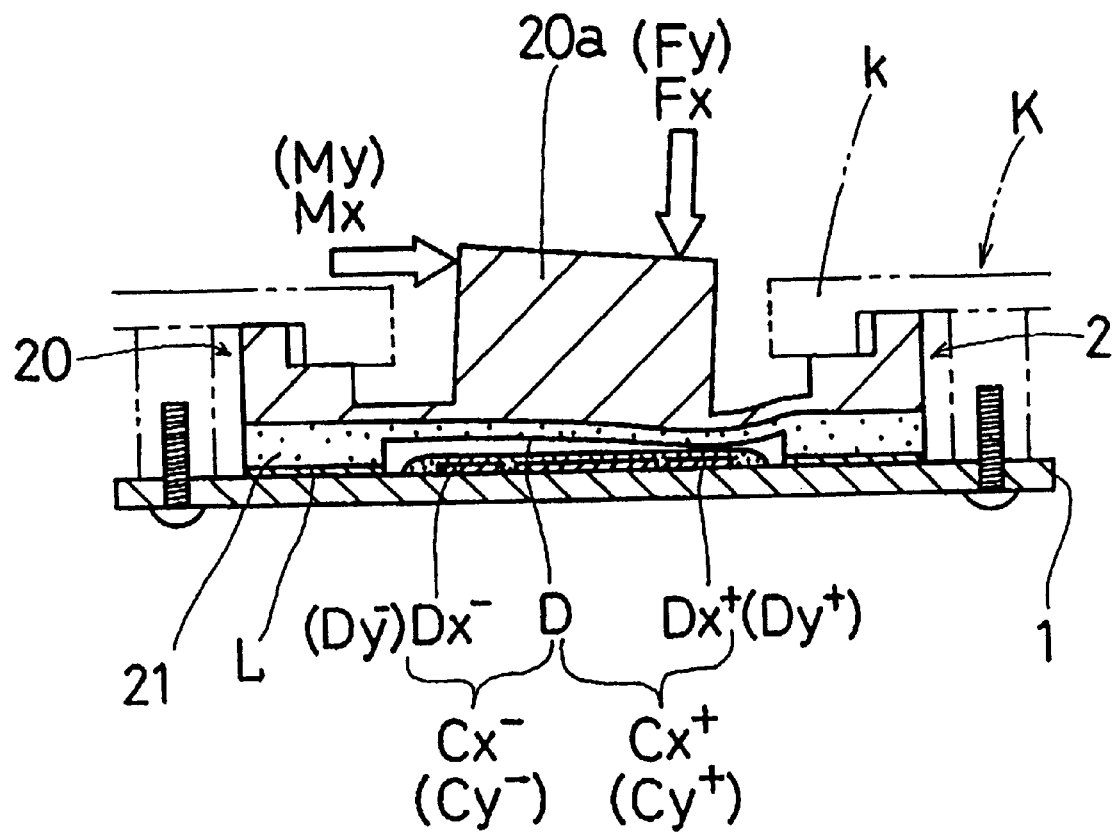
FIG. 3 is a cross-sectional view that shows a state in which a force or a moment in the X-axis direction is exerted on the operation portion of the touch sensor.

Since the electrostatic capacitive touch sensor S has the above-described construction, when the operation portion 20a is operated, it functions as follows:

First, as illustrated in FIG. 3, when a force Fx or a moment Mx in the X-axis direction is applied to the operation portion 20a, the gap between the electrode D and the fixed electrode Dx+ is narrowed, with the result that the electrostatic capacitance of the variable electrostatic capacitive section Cx+ becomes greater. In contrast, the gap between the electrode D and the fixed electrode Dx− does not change or it becomes greater, with the result that the electrostatic capacitance of the variable electrostatic capacitive section Cx+ does not change or it becomes smaller. Because of the symmetrical characteristic, the same is true for the fixed electrodes Dy+ and Dy− in the case when a force Fy or a moment My in the Y-axis direction is applied thereto. In other words, with respect to the XY plane, the conductive rubber layer section 21 constituting the electrode D is deformed depending on the magnitude and direction of the force that has been applied so that the electrostatic capacitances of the variable electrostatic capacitive sections Cx+, Cx−, Cy+, Cy− and Cz+ are changed correspondingly. When the force or moment described above is removed from the operation portion 20a, the elements that have been deformed and changed are returned to their original states.

Figure 4:
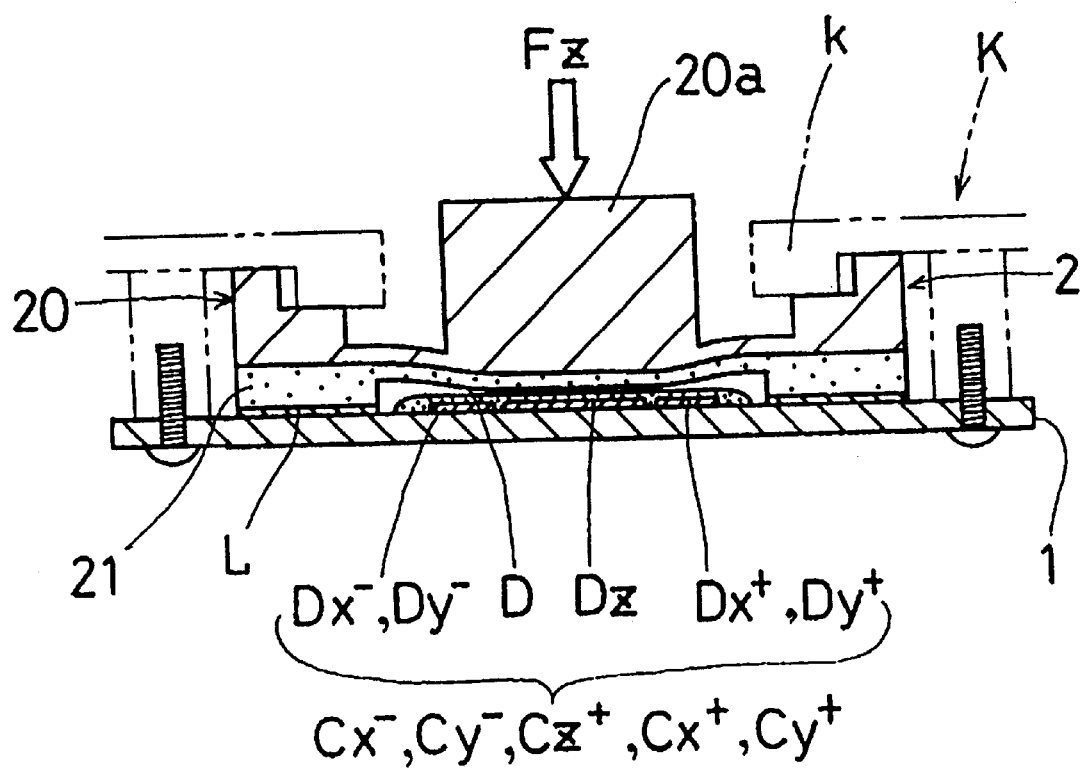
FIG. 4 is a cross-sectional view that shows a state in which a force in the Z-axis direction is exerted on the operation portion of the touch sensor.

Next, as illustrated in FIG. 4, when a force Fz in the Z-axis direction is applied, the gap between the electrode D and the fixed electrode Dz+ becomes smaller, with the result that the electrostatic capacitance of the variable electrostatic capacitive section Cz+ becomes greater. Moreover, the gaps between the electrode D and the fixed electrodes Dx+, Dx−, Dy+, Dy− and Dz+ are narrowed in a uniform manner, with the result that the electrostatic capacitances of the variable electrostatic capacitive sections Cx+, Cx−, Cy+ and Cy− become greater in a virtually uniform manner.

Figure 5:
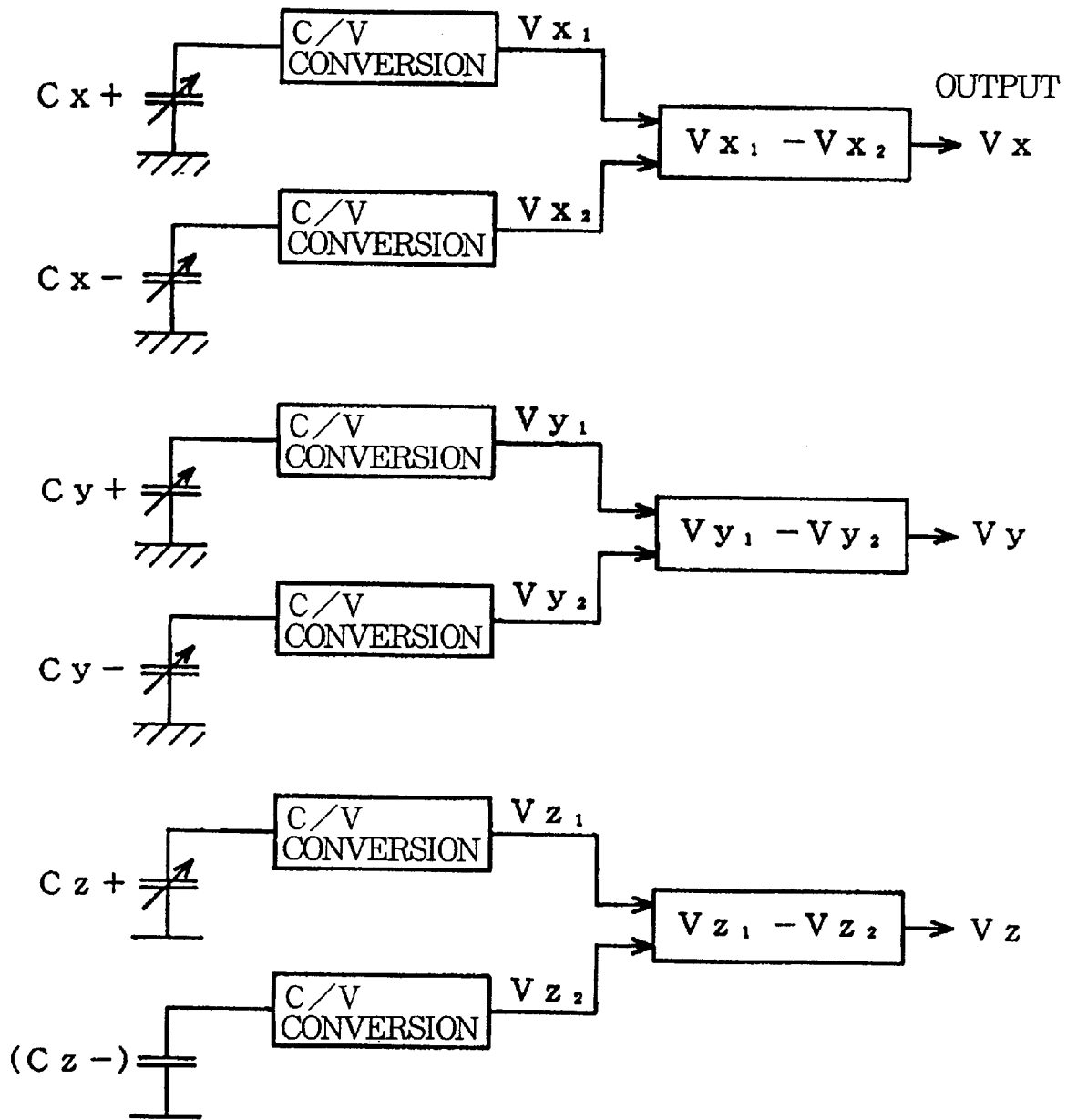
FIG. 5 is a circuit diagram that is used in the touch sensor.
Figure 6:
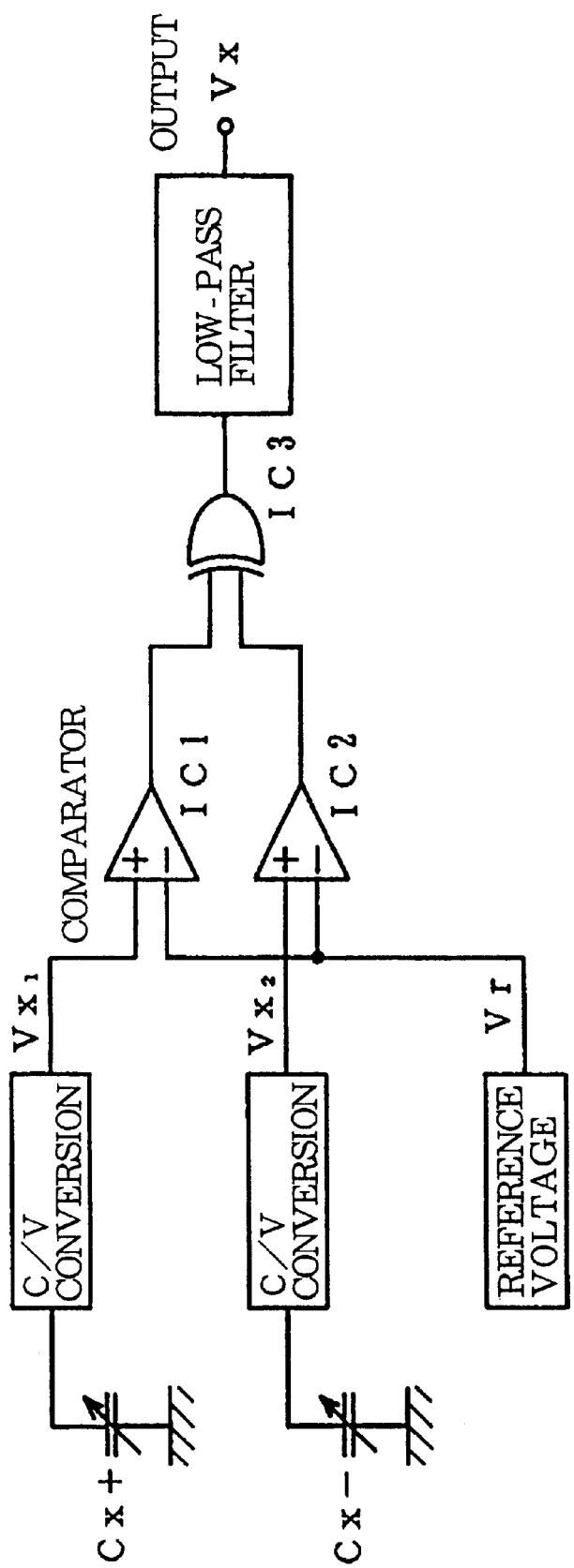
FIG. 6 is a circuit diagram that is used in another embodiment of the touch sensor.

As seen from the above, the electrostatic capacitances of the variable electrostatic capacitive sections Cx+, Cx−, Cy+, Cy− and Cz+ are changed in response to the magnitude of the force applied to the three dimensional space. Therefore, when a circuit as illustrated in FIG. 5 is formed, the magnitude and direction of the force applied to the operation portion 20a can be detected as voltage changes having respective components in X, Y and Z-axis directions. The same effects can be obtained when, instead of the circuit shown in FIG. 5, a circuit shown in FIG. 6 (in which circuits of the Y and Z axes are omitted) is adopted. In FIG. 6, it is supposed that Vx1 and Vx2 are allowed to change periodically.

Embodiment 2

Embodiment 2 of the present invention will be described with reference to FIGS. 7 and 8.

Figure 7:
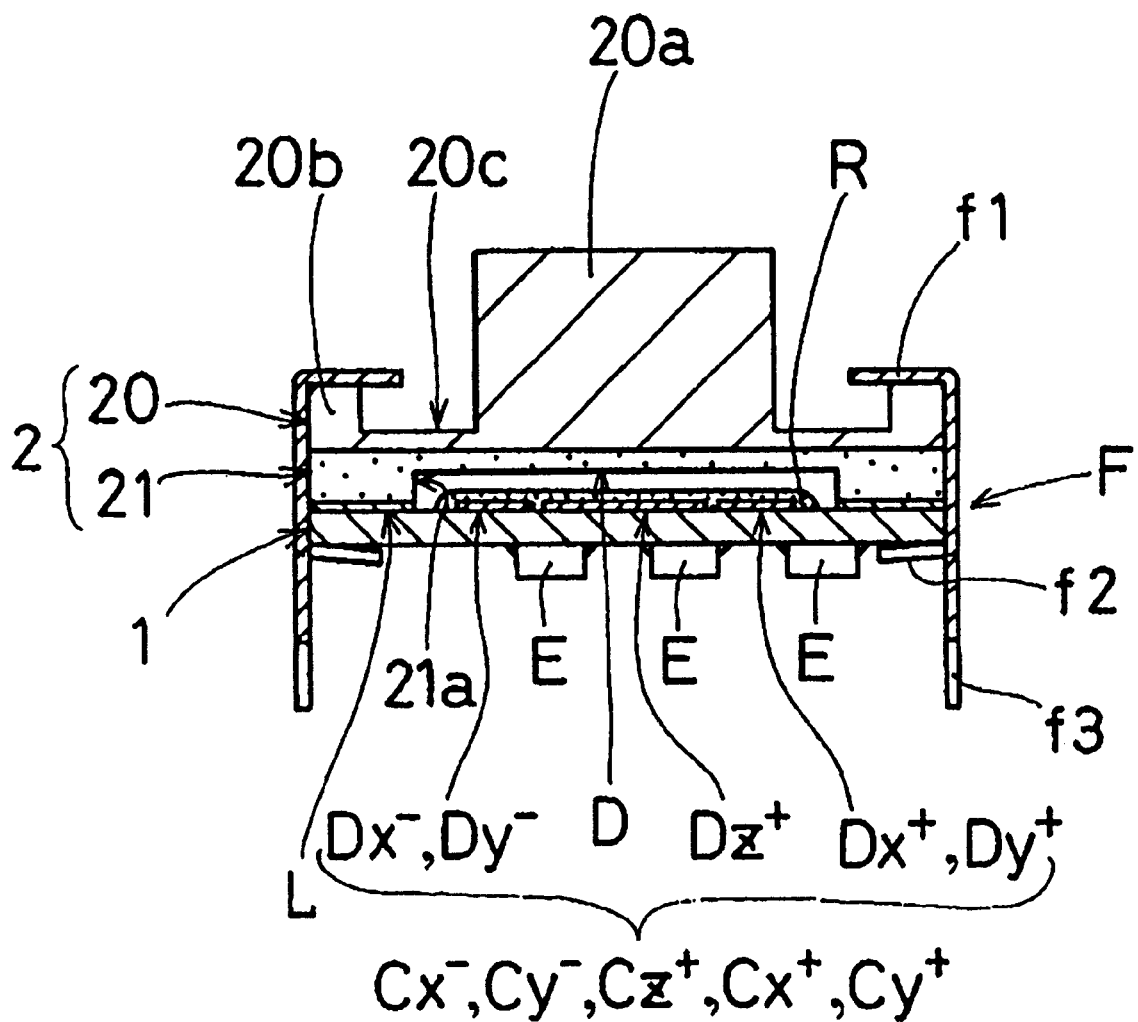
FIG. 7 is a cross-sectional view that shows an electrostatic capacitive touch sensor in accordance with Embodiment 2 of the present invention.
Figure 8:
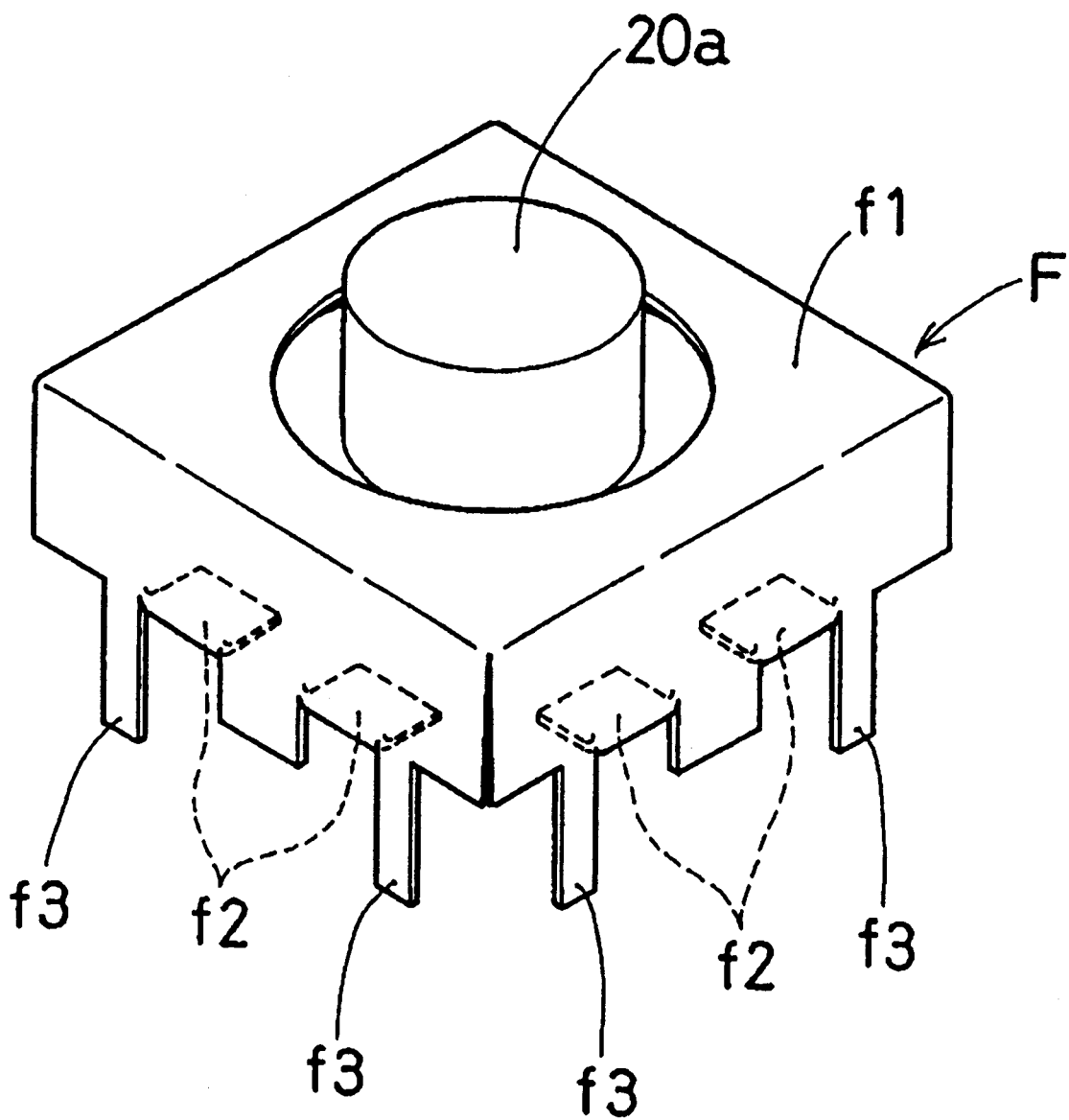
FIG. 8 is a perspective view that shows the external appearance of the electrostatic capacitive touch sensor in accordance with Embodiment 2 of the present invention.

In this Embodiment, a provision is made so as to solely assemble the device, and as illustrated in FIGS. 7 and 8, the substrate 1 and the movable electrode plate 2 are housed in a metal frame F, and the substrate 1 and the movable electrode plate 2 in their laminated state are sandwiched and held by an upper wall f1 and a bent portion f2 of the metal frame F. Therefore, in the same manner as in Embodiment 1, it is possible to prevent liquid, dust, etc. from entering the variable electrostatic capacitive sections Cx+, Cx−, Cy+, Cy− and Cz+ (that is, to exert a sealing property); and the conductive rubber layer section 21 and the contact-use land L come into contact with each other so that the conductive rubber layer section 21 of the movable electrode plate 2, as a whole, is allowed to have the GND electric potential. The reference symbol f3, shown in FIGS. 7 and 8, represents a lead terminal with solder, and through this, electric potential differences are applied between the contact-use land L and the fixed electrodes Dx+, Dx−, Dy+, Dx− and Dz+.

Here, the entire portion of the movable electrode plate 2 including the operation portion 20a may be formed by conductive rubber.

Figure 9:
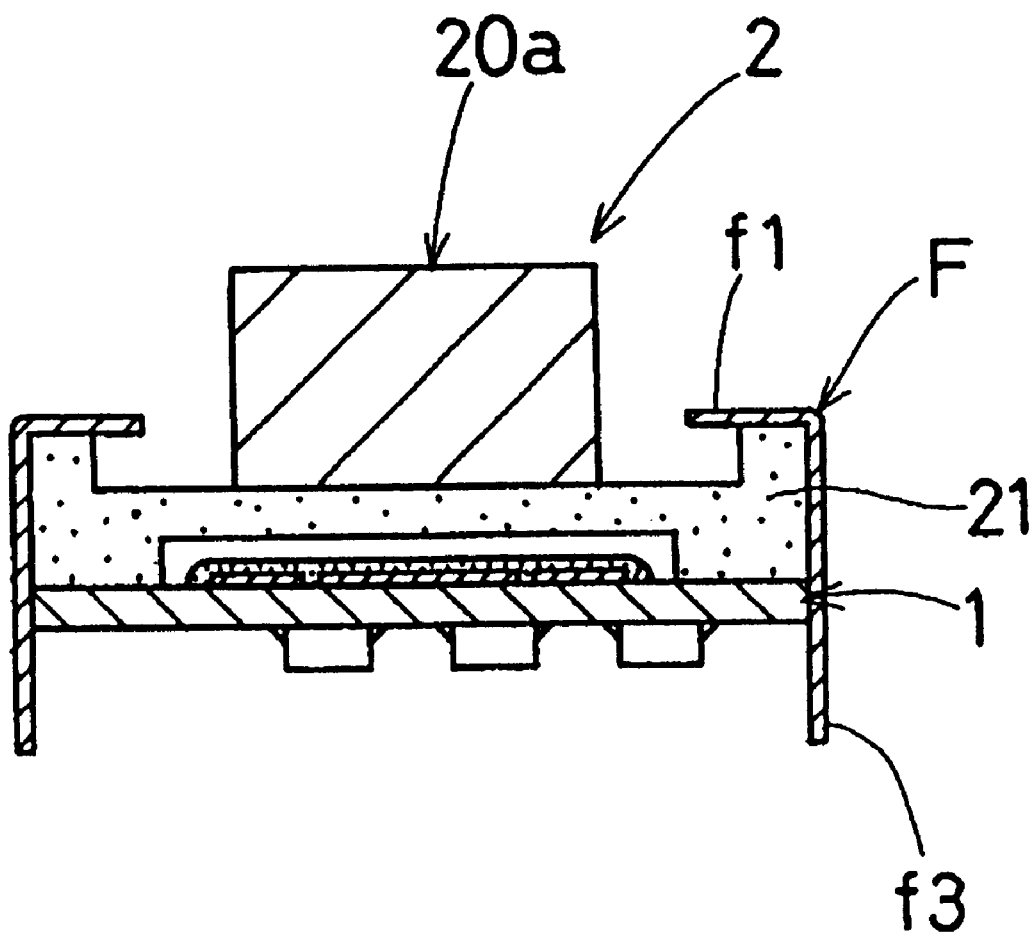
FIG. 9 is a cross-sectional view that shows a touch sensor related to the electrostatic capacitive touch sensor in accordance with Embodiment 2 of the present invention.

Moreover, with respect to the means for allowing the conductive rubber layer section 21 to have the GND (ground) electric potential, instead of installing the contact-use land L in this embodiment, the conductive rubber layer section 21 may be made in contact with the metal frame F as illustrated in FIG. 9 so that the lead terminal f3 of the metal frame F is connected to GND.

Embodiment 3

Figure 10:
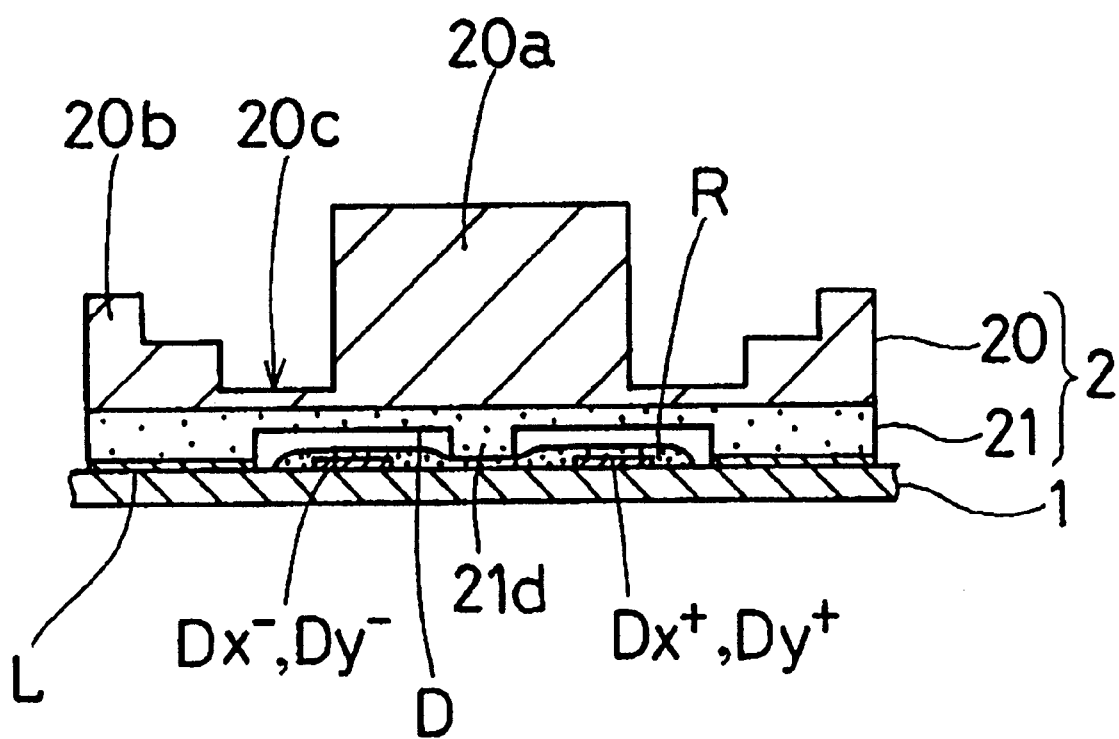
FIG. 10 is a cross-sectional view that shows an electrostatic capacitive touch sensor in accordance with Embodiment 3 of the present invention.

In the electrostatic capacitive touch sensor S of Embodiment 3, as illustrated in FIG. 10, only the fixed electrodes Dx+, Dx−, Dy+ and Dy−, covered with a resist film R, are placed on the substrate 1, and a protrusion 21d is attached to a portion of the conductive rubber layer section 21 opposing the portion surrounded by the fixed electrodes Dx+, Dx−, Dy+ and Dy− (the portion corresponding to Dz+ in FIGS. 1 and 7) in a manner so as to stick out downward. In this sensor S, the lower end of the protrusion 21d is allowed to contact the substrate 1 so that the protrusion 21d functions like the fulcrum of a lever. Therefore, when the sensor S having this construction is used as a joystick, it is possible to make the operability more stable.

Embodiment 4

Figure 11:
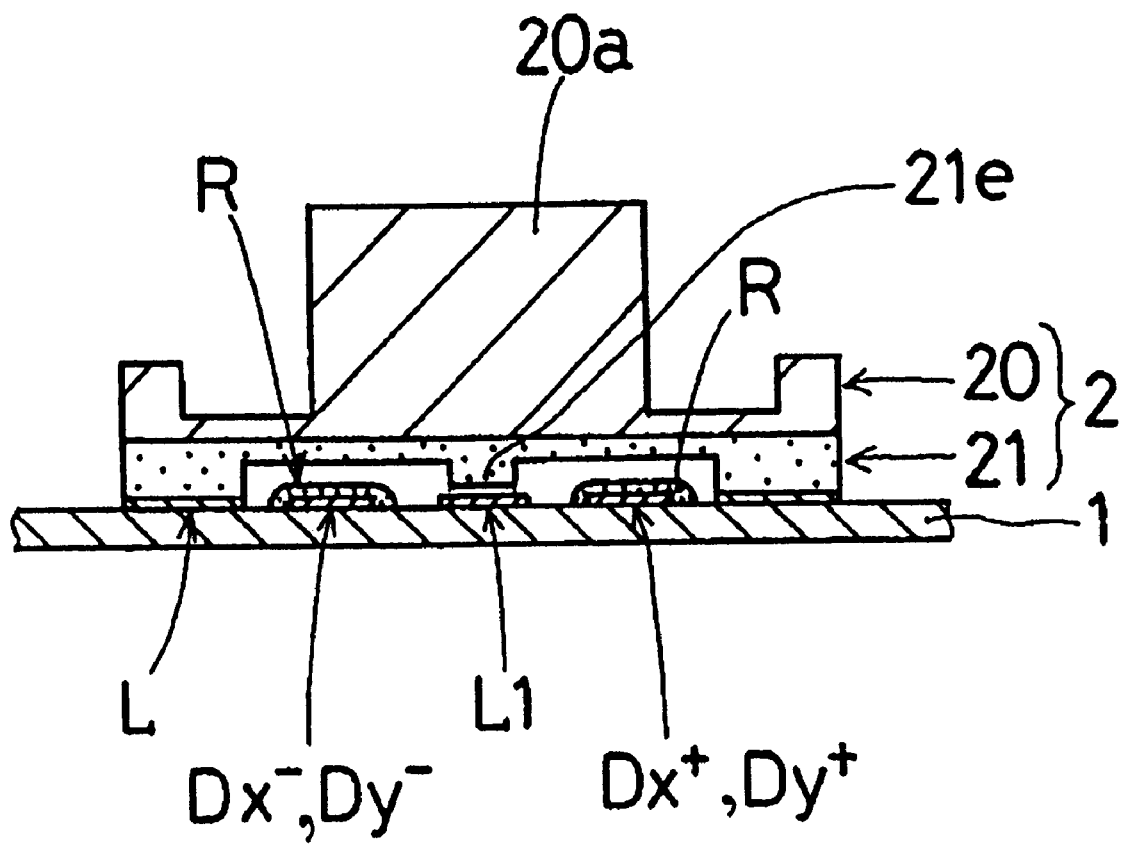
FIG. 11 is a cross-sectional view that shows an electrostatic capacitive touch sensor in accordance with Embodiment 4 of the present invention.

As illustrated in FIG. 11, in the electrostatic capacitive touch sensor S in Embodiment 4, an independent contact-use land L1 (without the resist film R) is formed on the substrate portion surrounded by the fixed electrodes Dx+, Dx−, Dy+ and Dy− covered with the resist film; and a protrusion 21e, which serves as an electrical contact, is formed on a portion of the conductive rubber layer section 21 opposing the contact-use land L1. The switch is thus obtained by the protrusion 21e and the contact-use land L1.

Embodiment 5

Figure 12:
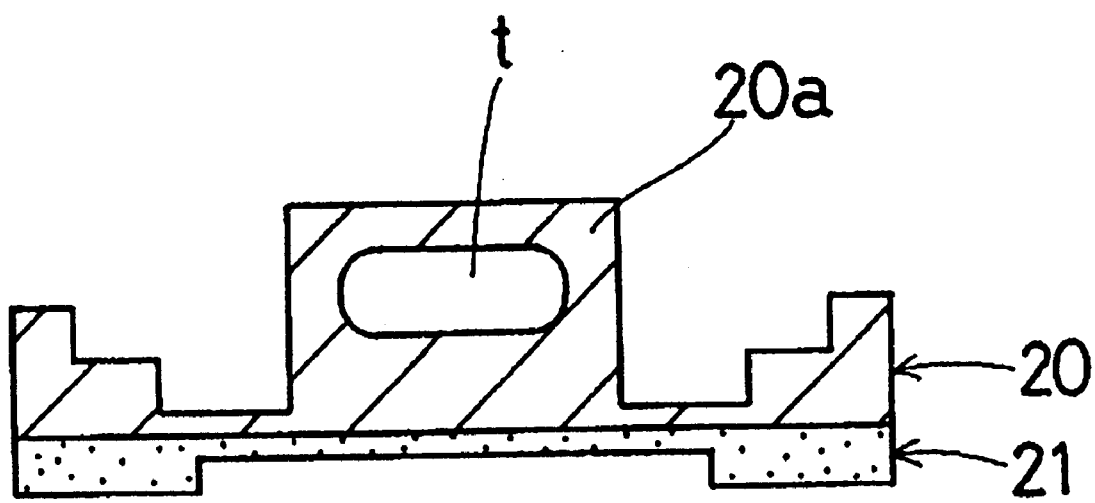
FIG. 12 is a cross-sectional view that shows an electrostatic capacitive touch sensor in accordance with Embodiment 5 of the present invention.
Figure 13:
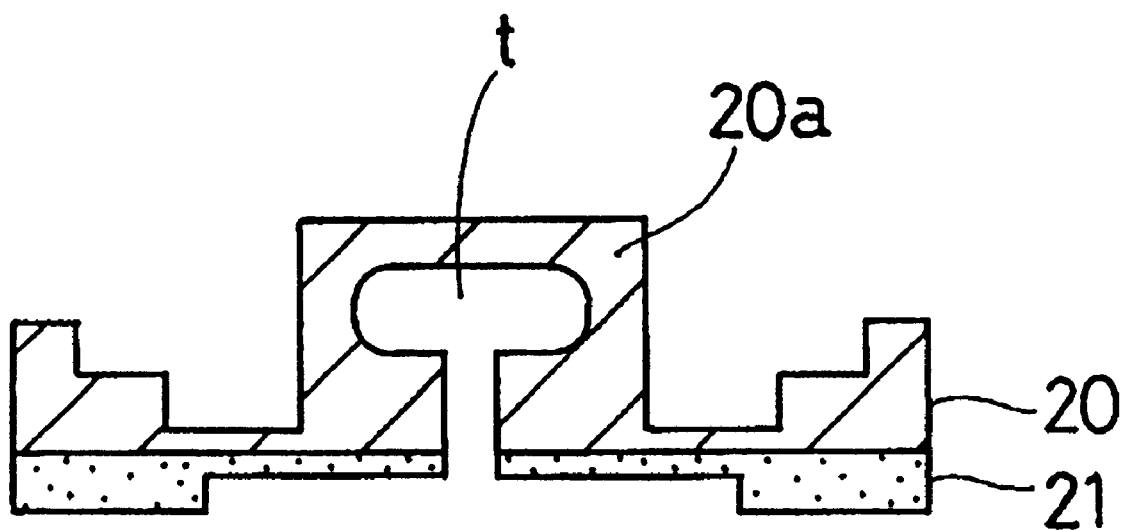
FIG. 13 is a cross-sectional view that shows a touch sensor related to the electrostatic capacitive touch sensor in accordance with Embodiment 5 of the present invention.

As illustrated in FIGS. 12 and 13, the electrostatic capacitive touch sensor S of Embodiment 4 is provided with a space section t (hollow portion) inside the operation portion 20a. Thus, the sensor has an improved virtual feeling of operation.

Other Embodiments

In Embodiments 1 through 5, as illustrated in FIGS. 12 and 13, the top end of the operation portion 20a may be formed into a concave- or convex-shape so as to improve the operability.

In the case when a force is applied by other than the hand, the shape of the operation portion may be changed depending on applications. For example, the top end of the operation portion may be formed into a shape to which a bearing, etc. may be attached so that the tension of a string may be measured.

Embodiment 6

Figure 14:
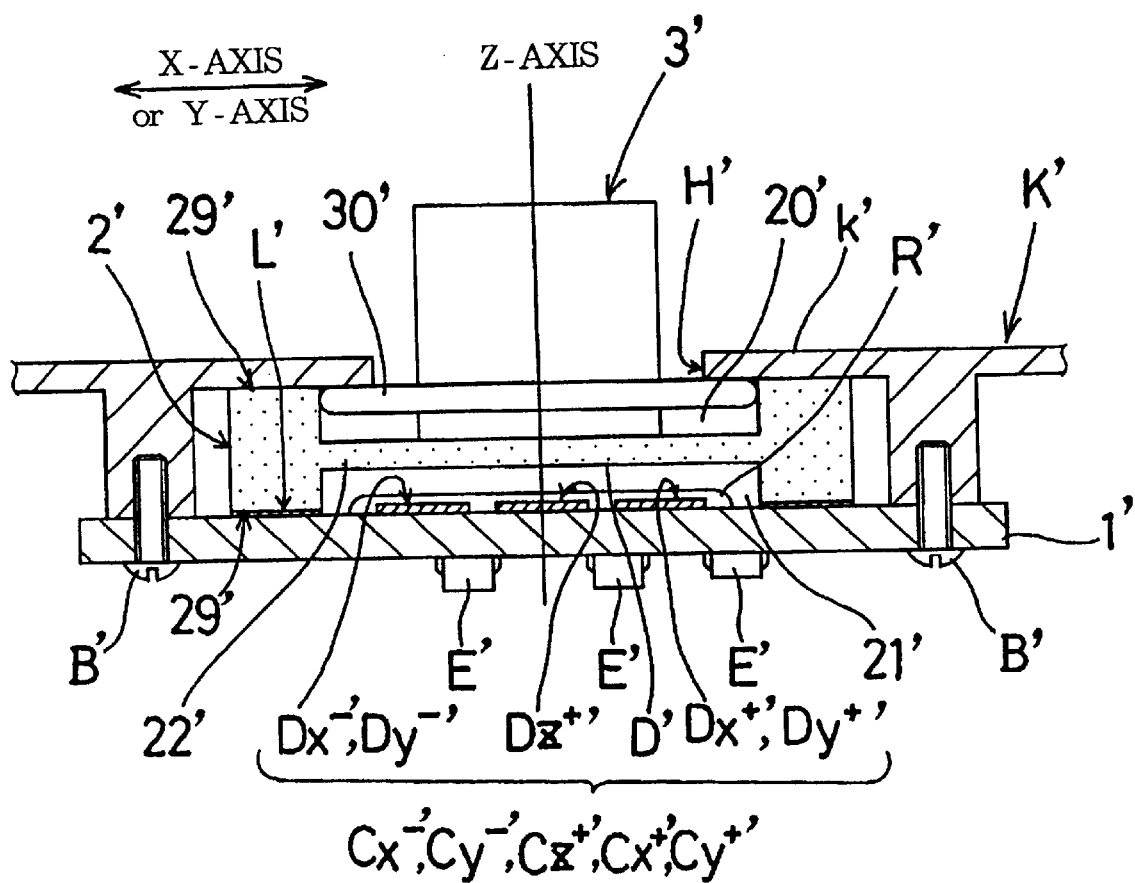
FIG. 14 is a cross-sectional view that shows an electrostatic capacitive touch sensor in accordance with Embodiment 6 of the present invention.

In this Embodiment 6 of the present invention as illustrated in FIG. 14, the electrostatic capacitive touch sensor S' is basically provided with a substrate 1', a movable electrode plate 2' placed on the substrate 1' and an operation portion 3' made of a hard material which is placed on the movable electrode plate 2' so as to transmit a force to the movable electrode plate 2'; thus, as illustrated in the same Figure, the substrate 1', placed at the lowermost position, is secured to an upper wall k' of a casing K' with machine screws B'.

Figure 15:
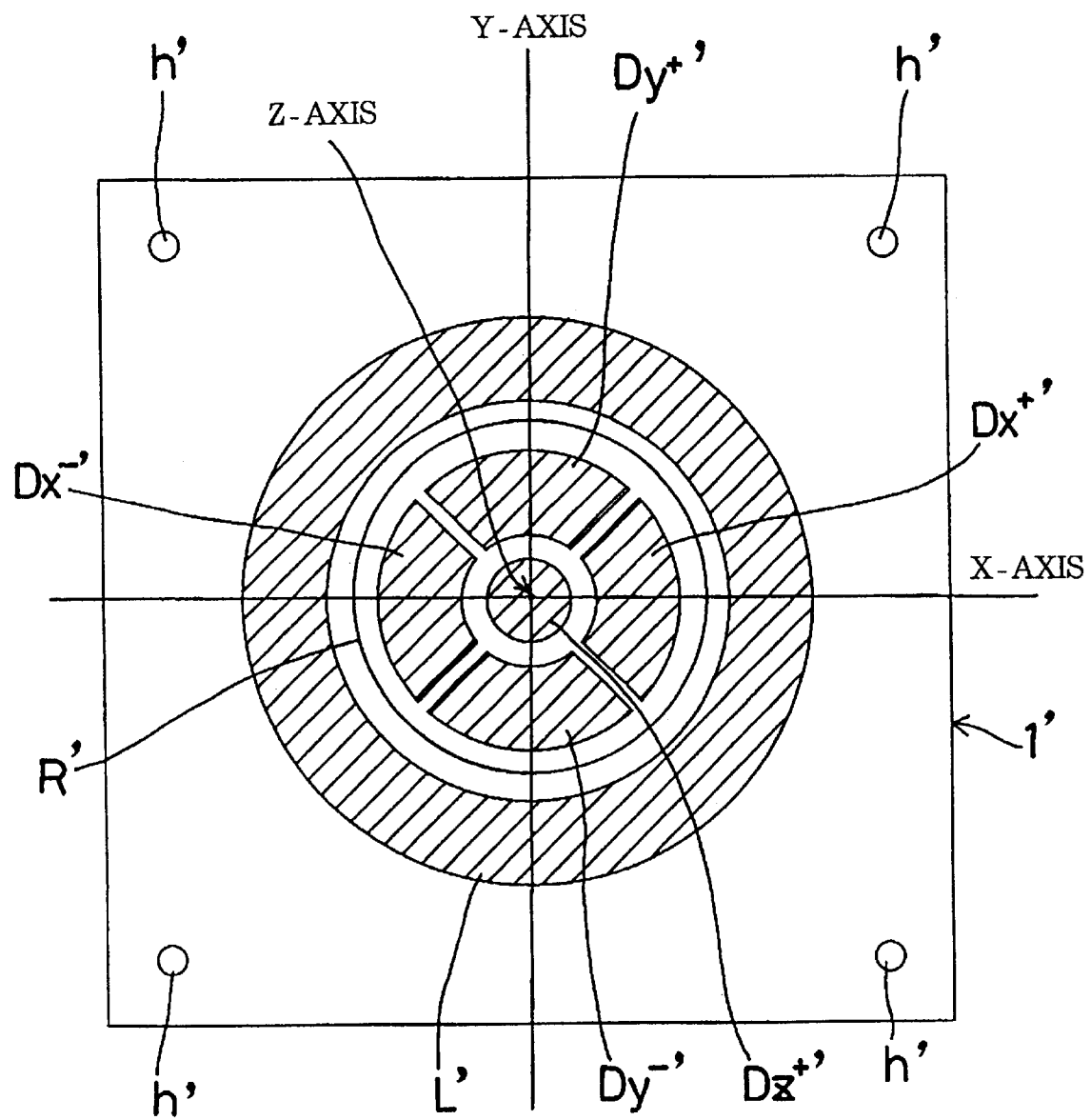
FIG. 15 is a plan view that shows fixed electrodes and a contact-use land formed on a substrate that constitute the electrostatic capacitive touch sensor.

As illustrated in FIGS. 14 and 15, the substrate 1' is provided with a ring-shaped contact-use land L' and fixed electrodes Dx+', Dx−', Dy+', Dy−' and Dz+' covered with a resist film R', all of which are formed on its front face, and an electronic part E' for electrostatic capacitance/voltage conversion is placed on its rear face. Moreover, penetration holes h' through which the machine screws B' are inserted are formed in the four corners thereof. The fixed electrodes Dx+', Dx−', Dy+', Dy−' and Dz+' are covered with the resist film R' so as to prevent these electrodes from directly contacting the movable electrode plate 2' which will be described later.

The movable electrode plate 2' is molded by using silicone rubber having a conductive property, which has a round shape when viewed from above, and as illustrated in FIG. 14, a diaphragm section 22' is formed in upper and lower central portions thereof in a manner so as to form round-shaped recesses 20' and 21' having a size large enough to accommodate the portions covered with the resist film R'. As illustrated in FIG. 14, the movable electrode plate 2' is set with a peripheral protruding portion 29' along its circumferential portion being sandwiched and held by the upper wall k' of the casing K' and the substrate 1' (thus being held with pressing forces being applied from both sides). In this Embodiment, the movable electrode plate 2' is formed by using silicone rubber; however, the present invention shall not be limited to this construction, and any high polymer material (elastomer) that exhibits high rubber elasticity in the vicinity of room temperature may be adopted; and examples thereof include closslinked natural rubber, synthetic rubber, thermoplastic urethane rubber, spandex, polycarbonate elastic resins, sponge rubber, etc.

As illustrated in FIG. 14, the operation portion 3' has a short rod shape made of hard resin and is provided with a peripheral protruding flange 30' in the vicinity of its bottom end. Moreover, the operation portion 3' is sandwiched between the movable electrode plate 2' and the upper wall k' so that the peripheral protruding flange 30' and the upper wall k' maintain contact with each other, and the rod bottom end and the bottom face of the recess 20' are also maintained in contact with each other. With respect to the material used for the operation portion 3', even rubber or, of course, metal may be adopted as long as it is greater in rigidity than the diaphragm section 22 of the movable electrode late 2'.

Here, as illustrated in FIG. 14, the movable electrode plate 2' is designed so as to form a distortion-effecting body in which, when a force is applied onto the operation portion 3', the stress is concentrated on the diaphragm section 22', thereby causing a distortion therein; thus, a portion of the movable electrode plate 2' facing the fixed electrodes is allowed to function as electrode D' forming variable electrostatic capacitive sections Cx+', Cx−', Cy+', Cy−' and Cz+' in combination with the fixed electrodes Dx+', Dx−', Dy+', Dy−' and Dz+', as will be described later.

When the thus structured electrostatic capacitive touch sensor S' is attached to the casing K' as illustrated in FIG. 14, the electrostatic capacitive touch sensor S' functions in the following manner:

Since the peripheral protruding portion 29' of the movable electrode plate 2' is sandwiched and held by the upper wall k' of the casing K' and the substrate 1', the press-contact state between the substrate 1' and the peripheral protruding portion 29' on the rear side makes it possible to prevent liquid, dust, etc. from entering the variable electrostatic capacitive sections Cx+', Cx−', Cy+', Cy−' and Cz+' (thus exerting a sealing property); and the press-contact state between the rear face of the upper wall k' and the peripheral protruding portion 29' makes it possible to prevent liquid, dust, etc.

from entering a hole H' formed in the upper wall k' (that is, to exert a sealing property).

The above-described press-contact state of the peripheral protruding portion 29' of the movable electrode plate 2' and the contact-use land L' allows the movable electrode plate 2' to have the GND electric potential. Therefore, electric potential differences are provided between the contact-use land L' and the fixed electrodes Dx+', Dx−', Dy+', Dy−' and Dz+' so that the variable electrostatic capacitive sections Cx+', Cx−', Cy+', Cy−' and Cz+' are exerted.

The assembling process is simply carried out by sandwiching the movable electrode plate 2' and the operation section 3' between the upper plate k' and the substrate 1' and then securing the substrate 1' to the upper plate k' with machine screws B'.

Since the electrostatic capacitive touch sensor S' has the above-mentioned construction, when the operation portion 3' is operated, the sensor S' functions as follows:

In this sensor S', when a force is applied to the operation portion 3', the diaphragm section 22' of the movable electrode 2' is greatly deformed; however, since the operation portion 3' is greater in rigidity as compared with the movable electrode plate 2', the force applied to the operation section 3' is effectively transmitted to the diaphragm section 22'. Therefore, the diaphragm section 22' is greatly deformed so that the electrostatic capacitances of the variable electrostatic capacitive sections Cx+', Cx−', Cy+', Cy−' and Cz+', formed by the diaphragm section 22' functioning as the electrode D' and the fixed electrodes Dx+', Dx−', Dy+', Dy−' and Dz+', are greatly changed.

Figure 16:
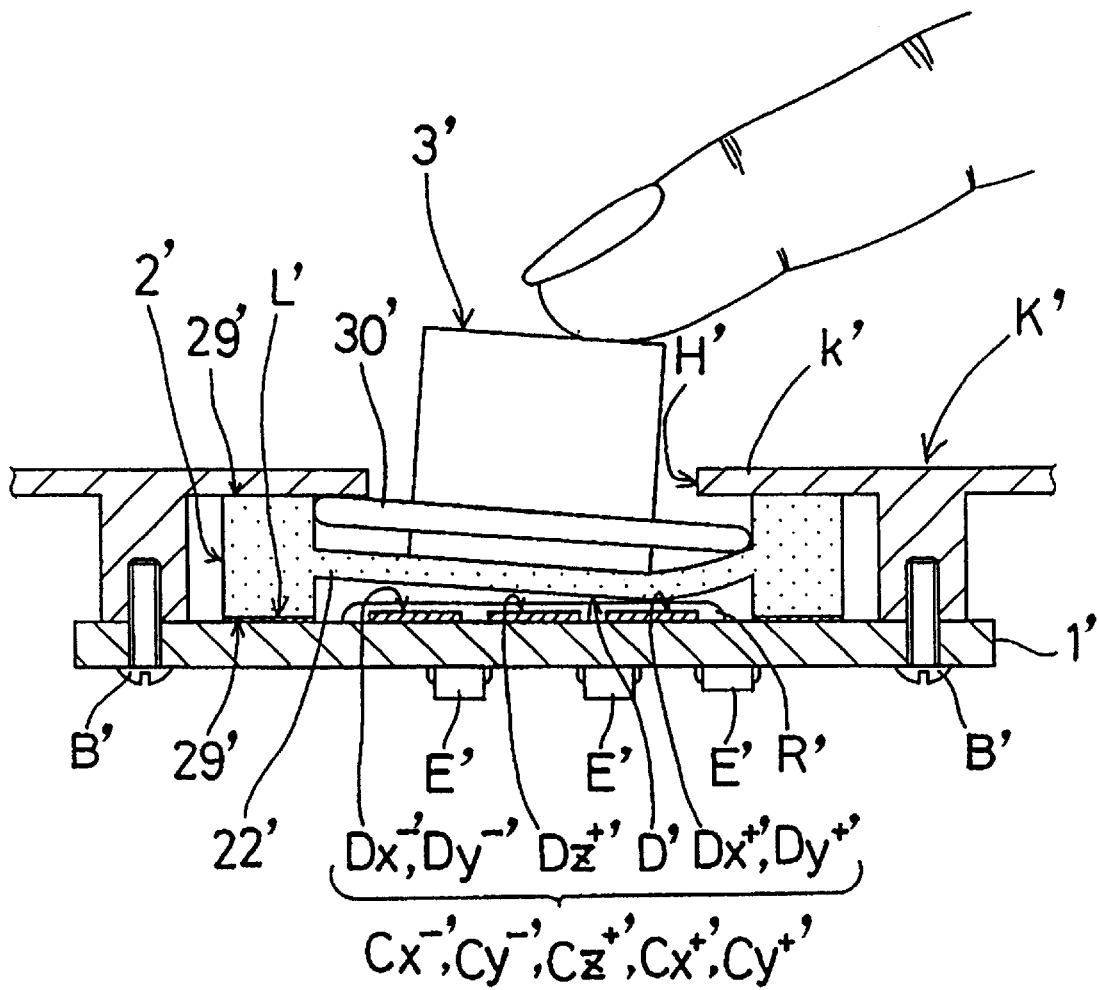
FIG. 16 is a cross-sectional view that shows a state in which the operation portion of the electrostatic capacitive touch sensor is tilted in the X-axis direction.

Here, when a tilting force is applied to the operation portion 3', the gap between the diaphragm section 22' functioning as the electrode D' and the fixed electrode Dx+' becomes smaller as illustrated in FIG. 16, thereby increasing the electrostatic capacitance of the variable electrostatic capacitive section Cx+'. In contrast, the gap between the electrode D' and the fixed electrode Dx−' is increased or reduced; however, the amount of its change is smaller as compared with the change between the electrode D' and the fixed electrode Dx+', with the result that the amount of change in the electrostatic capacitance of the variable electrostatic capacitive section Cx−' is small. Moreover, in this case, since the gap between the electrode D' and the fixed electrode Dz+' becomes smaller, the electrostatic capacitance of the variable electrostatic capacitive section Cz+' becomes greater.

Figure 17:
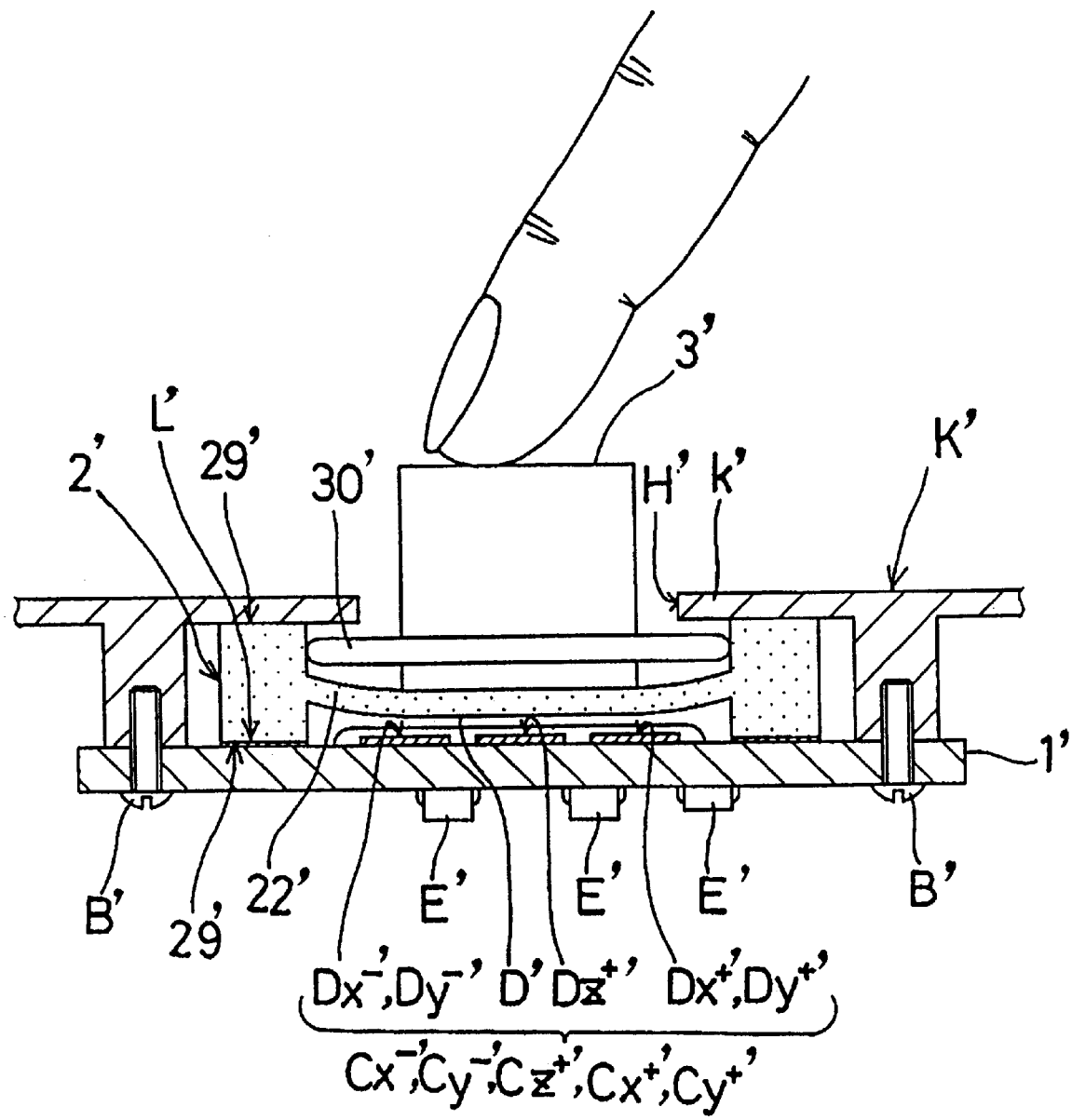
FIG. 17 is a cross-sectional view that shows a state in which the operation portion of the electrostatic capacitive touch sensor is pushed in the Z-axis direction.

Moreover, when a force in a push-in direction is applied to the operation portion 3', the gap between the electrode D' and the fixed electrode Dz+' becomes smaller as illustrated in FIG. 17; as a result, the electrostatic capacitance of the variable electrostatic capacitive section Cz+' becomes greater. In the same manner, the gaps between the electrode D' and the fixed electrodes Dx+', Dx−', Dy+' and Dy−' become equally smaller, and the electrostatic capacitances of the variable electrostatic capacitive sections Cx+', Cx−', Cy+' and Cy−' become greater.

Figure 18:
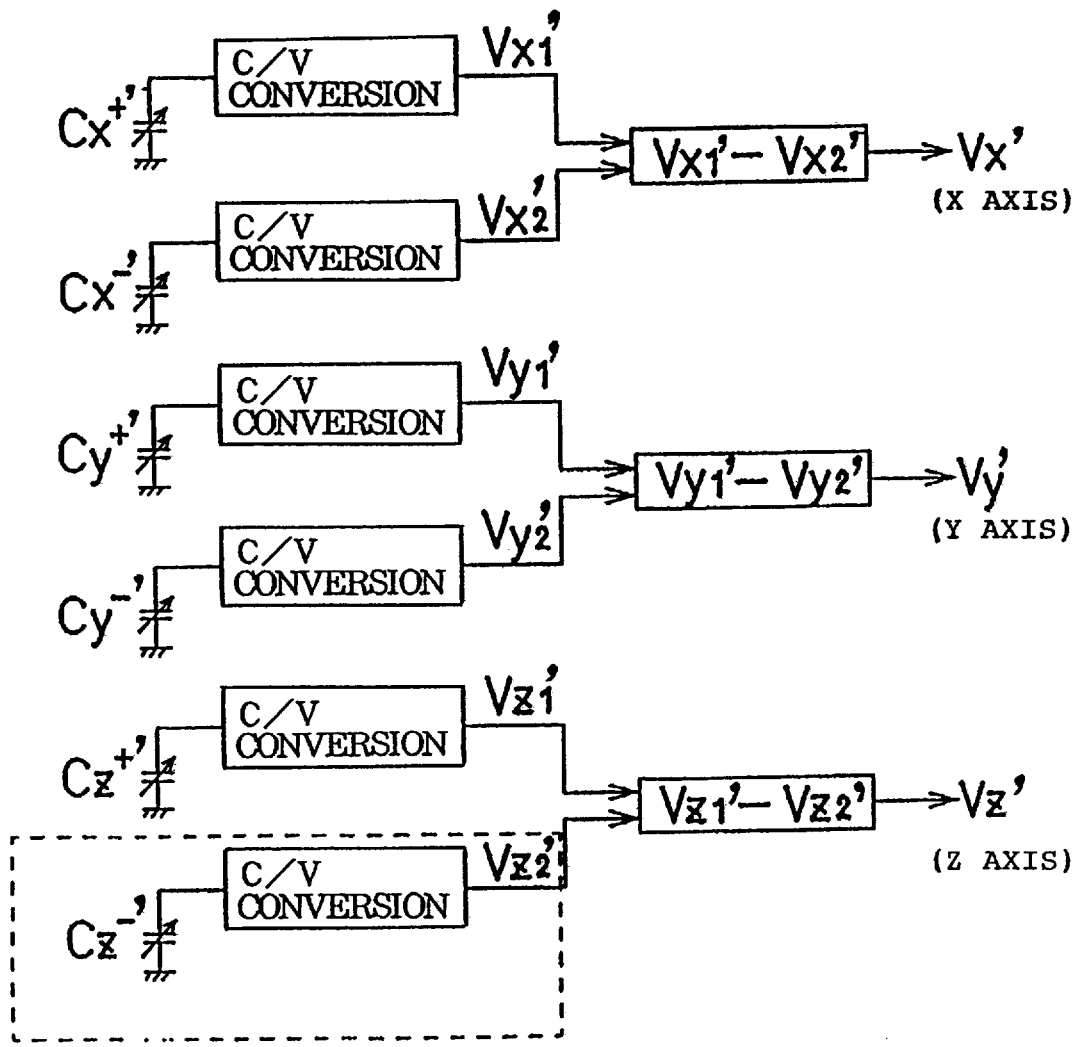
FIG. 18 is a block diagram that shows an electrostatic capacitance-voltage conversion circuit that is used in the electrostatic capacitive touch sensor.

In the electrostatic capacitive touch sensor S', a circuit (block diagram), as shown in FIG. 18, constituted by a plurality of electronic parts E', is installed so that based upon the changes in the electrostatic capacitances of the variable electrostatic capacitive sections Cx+', Cx−', Cy+', Cy−' and Cz+', the magnitude and direction of a force applied to the operation portion 3' are detected as voltage outputs (Vx', Vy' and Vz'). Here, in FIG.18, symbol Cz−' represents a dummy fixed capacitance; however, the existence of the fixed capacitance Cz−' is not necessarily a condition absolutely required. Moreover, the portion of FIG. 18 surrounded by a dot line may be replaced by a constant voltage supply.

Figure 19:
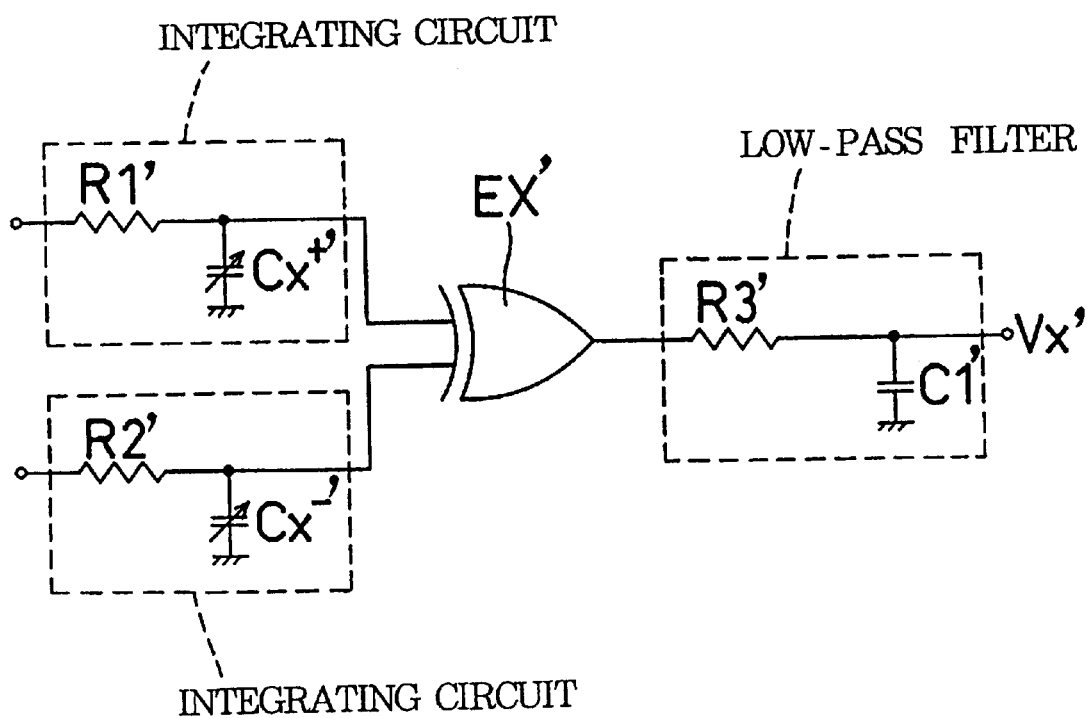
FIG. 19 shows a specific circuit of the electrostatic capacitance-voltage conversion circuit.

FIG. 19 shows a specific circuit corresponding to the circuit of FIG. 18 (in which circuits in the Y and Z-axes are omitted). In FIG. 19, symbols R1', R2' and R3' are fixed resistors, symbol EX' is an exclusive-OR circuit, and symbol C1' is a fixed capacitance.

Embodiment 7

Figure 20:
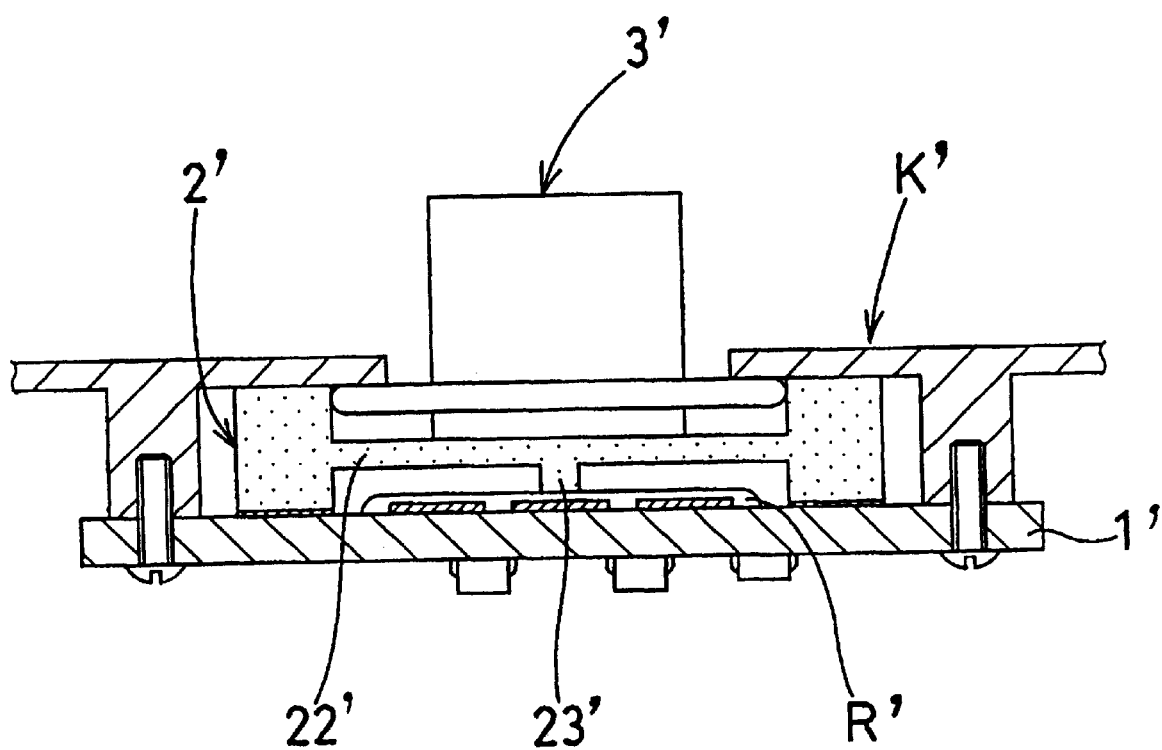
FIG. 20 is a cross-sectional view that shows an electrostatic capacitive touch sensor in accordance with Embodiment 7 of the present invention.

The electrostatic capacitive touch sensor S' of Embodiment 7 has virtually the same arrangement as that of Embodiment 6; however, as illustrated in FIG. 20, a protrusion 23' is installed in the center of the diaphragm 22' so as to stick out downward, and the lower end of the protrusion 23 is allowed to contact (or to be placed close to) the resist film R'.

In the sensor S' of Embodiment 6 in which the movable electrode plate 2' is made of silicone rubber, the sensitivity in the Z-axis direction is too great as compared with the sensitivities in the X-axis and Y-axis directions; however, in the sensor S' of Embodiment 7, the existence of the protrusion 23' makes it possible to adjust and suppress the sensitivity in the Z-axis direction.

Embodiment 8

Figure 21:
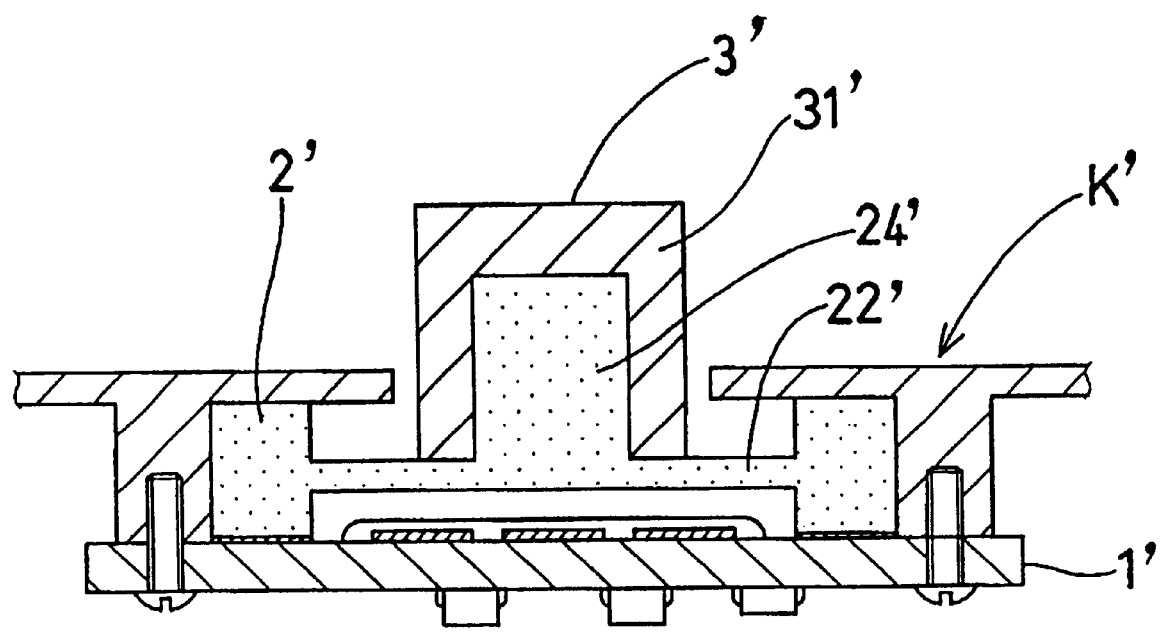
FIG. 21 is a cross-sectional view that shows an electrostatic capacitive touch sensor in accordance with Embodiment 8 of the present invention.

The electrostatic capacitive touch sensor S' of Embodiment 8 has virtually the same arrangement as that of Embodiment 6; however, as illustrated in FIG. 21, with respect to the operation portion 3', a rod-shaped protrusion 24' is installed on the upper face of the diaphragm section 22' and a cap 31' is bonded to the protrusion 24'.

Embodiment 9

Figure 22:
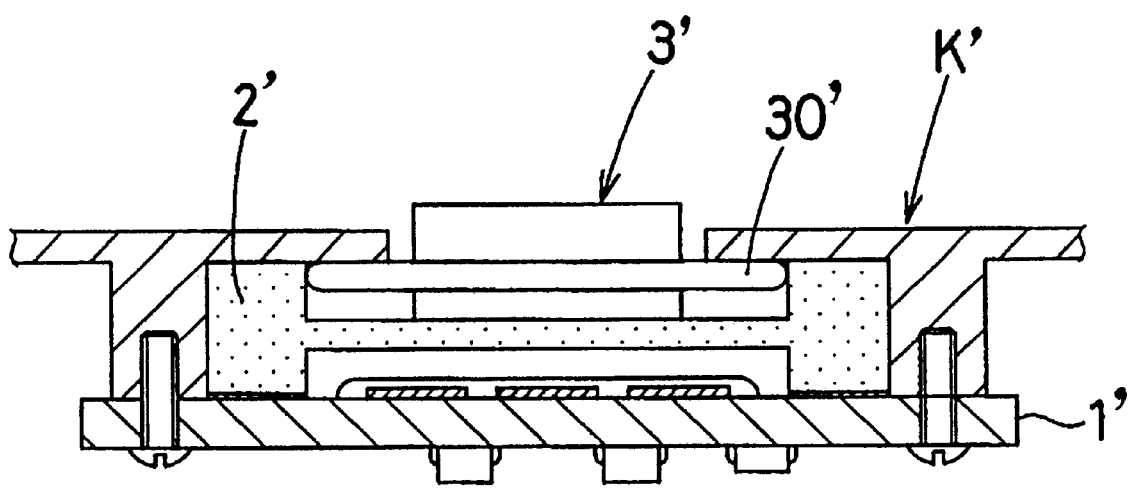
FIG. 22 is a cross-sectional view that shows an electrostatic capacitive touch sensor in accordance with Embodiment 9 of the present invention.

The electrostatic capacitive touch sensor S' of Embodiment 9 has virtually the same arrangement as that of Embodiment 6; however, as illustrated in FIG. 22, the operation portion 3' is a short push button.

Embodiment 10

Figure 23:
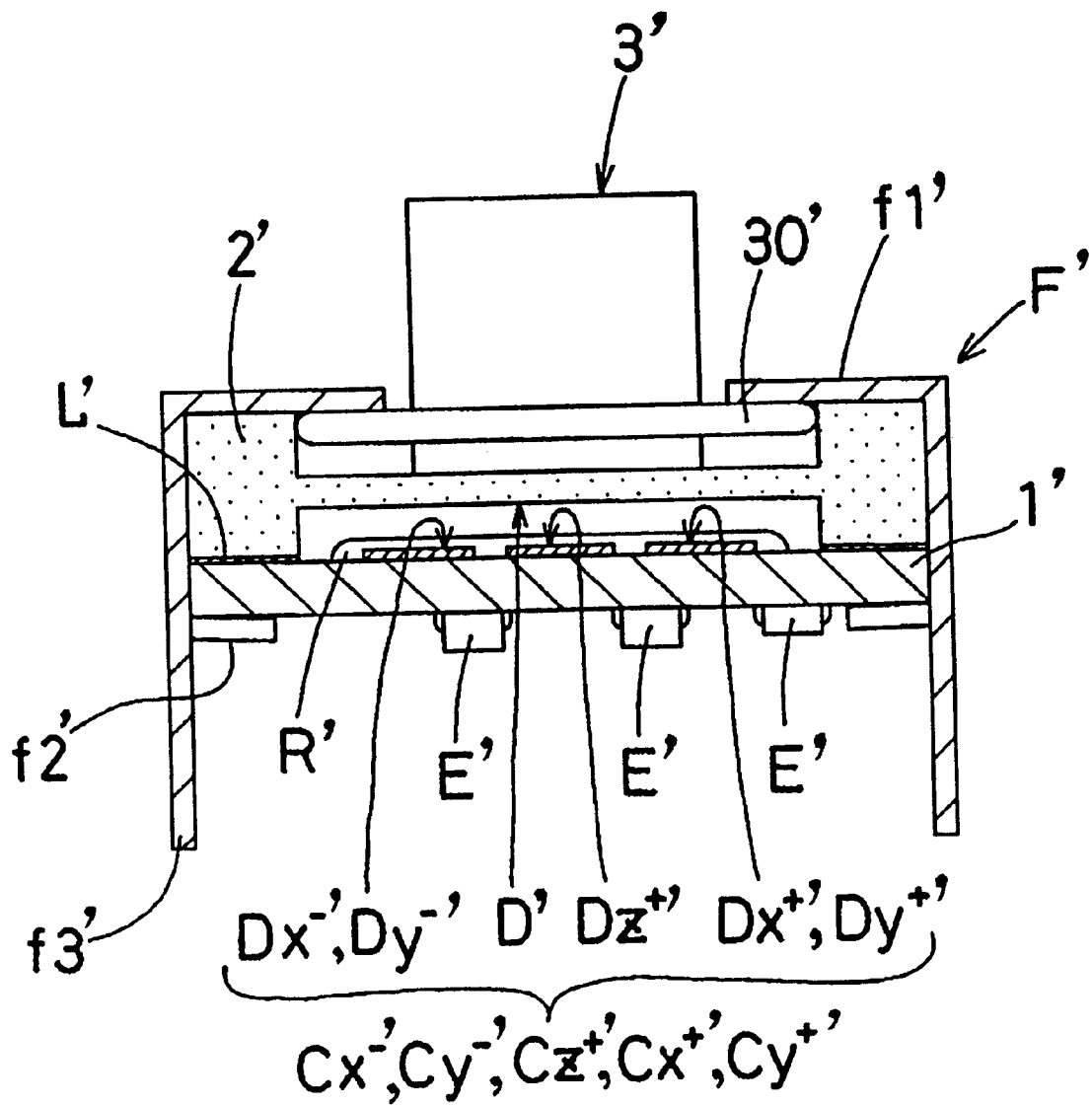
FIG. 23 is a cross-sectional view that shows an electrostatic capacitive touch sensor in accordance with Embodiment 10 of the present invention.
Figure 24:
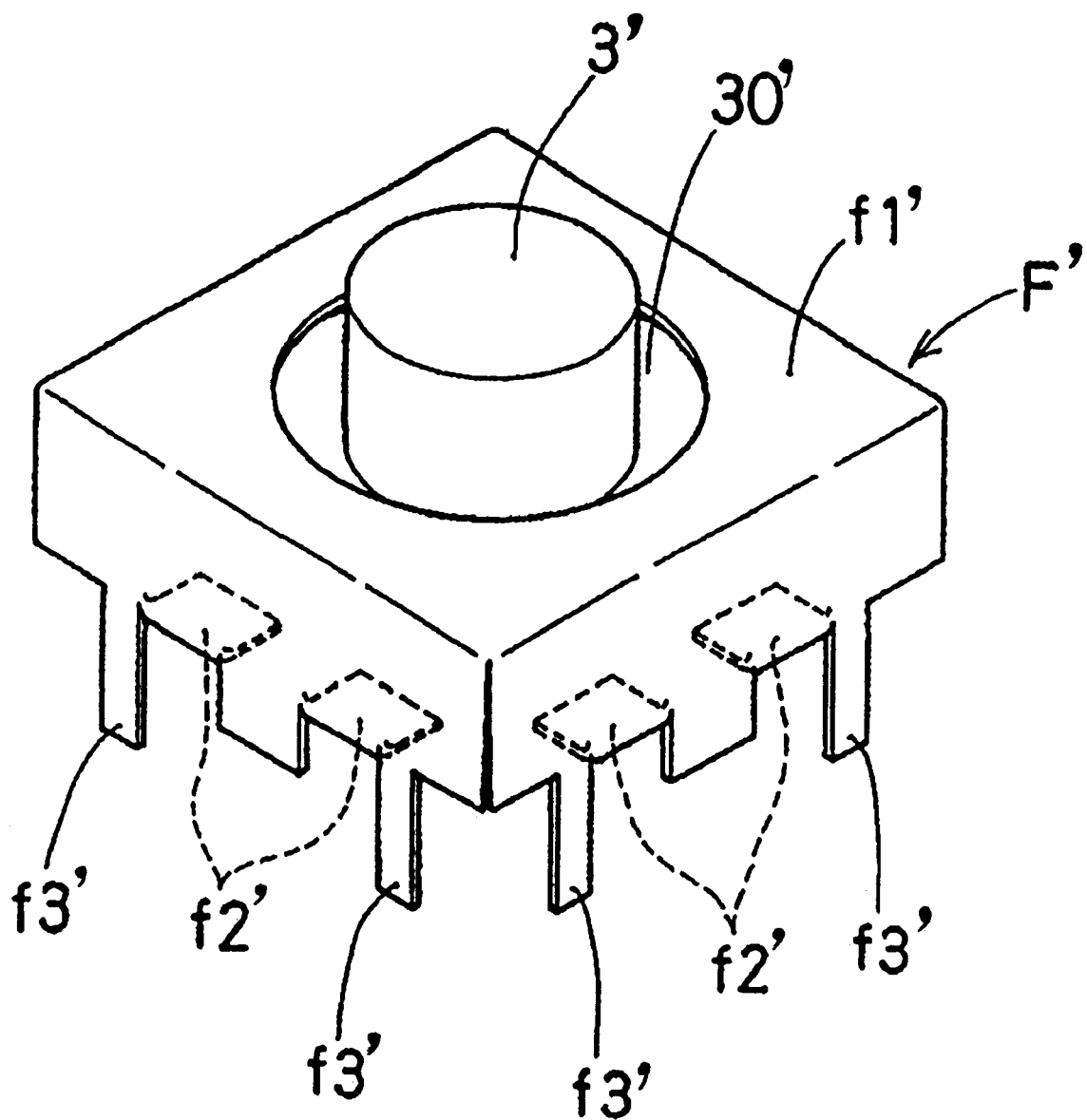
FIG. 24 is a perspective view that shows the external appearance of an electrostatic capacitive touch sensor in accordance with Embodiment 10 of the present invention.
Figure 25:
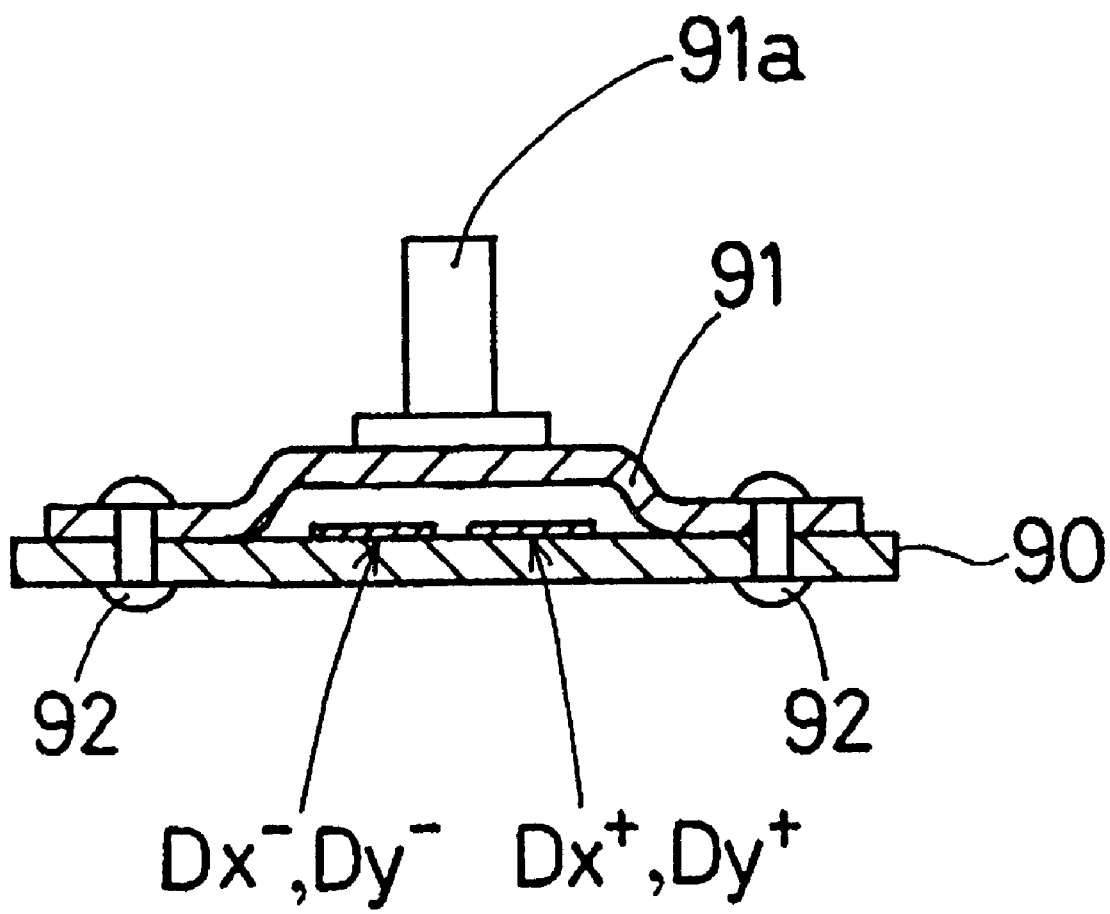
FIG. 25 is a cross-sectional view that shows a conventional electrostatic capacitive touch sensor.

As illustrated in FIGS. 23 and 24, in the electrostatic capacitive touch sensor S' in Embodiment 10, provision is made so as to solely assemble the device; and the substrate 1', the movable electrode plate 2' and the operation portion 3' are housed in a metal frame F' in a stacked manner, and the substrate 1', the movable electrode plate 2' and the operation portion 3' in their laminated state are sandwiched and held by an upper wall f1' and a bent portion f2' of the metal frame F'. Here, in FIG. 23, symbol f3' represents a lead terminal with solder, and through this, electric potential differences are applied between the movable electrode plate 2', the contact-use land L' in its electrically connected state, and the fixed electrodes Dx+', Dx−', Dy+', Dx−' and Dz+'.

Other Embodiments

A protrusion may be formed on at least either one of the opposing faces of the substrate 1' and the movable electrode plate 2' so as to prevent the gap between the fixed electrodes and the movable electrode plate 2' from becoming too narrow.

An independent contact-use land is formed in a portion of the substrate 1' surrounded by the fixed electrodes Dx+', Dx−', Dy+' and Dy−' that are disposed with an interval of 90° with each other, and a protrusion serving as an electric contact is formed on a portion of the movable electrode plate 2' facing the contact-use land so as to form a switch by the protrusion and the contact-use land.

As seen from the above, the electrostatic capacitive touch sensor of the present invention makes it possible to reduce the number of troublesome assembling processes, and easily make the device water-proof and dust-proof without increasing the number of parts. Moreover, the electrostatic capacitive touch sensor of the present invention makes it possible to reduce the number of troublesome assembling processes, easily make the device water-proof and dust-proof without increasing the number of parts, and to provide a high sensitivity as a sensor.

What is claimed is:

1. An electrostatic capacitive touch sensor, comprising:
   a substrate having a group of fixed electrodes which are disposed to work as a pair formed thereon; and
   a movable electrode plate that is integrally molded from a material selected from the group consisting of rubber and resin having an elastic property as a whole and has at least a face which opposes the group of fixed electrodes, said face being made from a material selected from the group consisting of a conductive rubber and a conductive resin, said movable electrode plate being provided with a protrusion which extends downward and a lower end of which is in contact with a center portion of said group of fixed electrodes of said substrate, wherein
   the group of fixed electrodes and the movable electrode plate are allowed to form a plurality of variable electrostatic capacitive sections, and wherein
   in response to the magnitude and direction of a force applied onto the movable electrode plate, the electrostatic capacitances of the respective variable electrostatic capacitive sections are allowed to change.

2. The electrostatic capacitive touch sensor according to claim 1, wherein the group of fixed electrodes are arranged so as to have an interval of 180° from each other, and wherein, based upon a change in the electrostatic capacitances between two variable electrostatic capacitive sections, a magnitude in an X-axis direction of a force applied onto the operation portion is detected together with a positive or negative direction thereof.

3. The electrostatic capacitive touch sensor according to claim 1, wherein the substrate and the movable electrode plate are enclosed by a metal frame, and one portion of the metal frame is bent over so that the movable electrode plate and the substrate are secured to the metal frame in a manner so as to be pressed thereon, and wherein foreign matters are prevented from entering the variable electrostatic capacitive section from outside by using a sealing property exerted by the elastic restoration force of the movable electrode plate.

4. The electrostatic capacitive touch sensor according to claim 3, wherein the metal frame has a conductive property so that the movable electrode plate is allowed to hold a predetermined voltage through the metal frame.

5. The electrostatic capacitive touch sensor according to claim 1, wherein the electrodes of the group of fixed electrodes are arranged so as to have an interval of 90° with each other, and wherein,
   based upon a change in the electrostatic capacitances between two variable electrostatic capacitive sections that face each other on one straight line, a magnitude in an X-axis direction of a force applied onto the operation portion is detected together with a positive or negative direction thereof; and
   based upon a change in the electrostatic capacitances between the two variable electrostatic capacitive sections that face each other on the other straight line, a magnitude in a Y-axis direction of a force applied onto the operation portion is detected together with a positive or negative direction thereof.

6. The electrostatic capacitive touch sensor according to claim 5, wherein an independent electrode is formed on a substrate portion surrounded by four electrodes disposed with an interval of 90° with each other, and wherein, based upon a change in the electrostatic capacitance of the variable electrostatic capacitive section that is formed by the independent electrode and the variable electrode plate, a magnitude in a Z-axis direction of a force applied onto the operation portion is detected together with a positive or negative direction thereof.

7. The electrostatic capacitive touch sensor according to claim 1, further comprising an operation portion for transmitting force to said movable electrode plate, said operation portion being made of rubber or resin, having a protruding shape and being integrally molded with the movable electrode plate.

8. The electrostatic capacitive touch sensor according to claim 7, wherein the operation portion is provided with a space section.

9. The electrostatic capacitive touch sensor according to claim 7, wherein a peripheral protruding portion is formed on the movable electrode plate so as to surround the operation portion, and wherein when the movable electrode plate is attached to a fixing member with the peripheral protruding portion being pressed thereon, a sealing property between the fixing member and the movable electrode plate is secured by the elastic restoration force of the peripheral protruding portion.

10. An electrostatic capacitive touch sensor, comprising:
    a substrate having a group of fixed electrodes which are disposed to work as a pair formed thereon; and
    a movable electrode plate that is integrally molded from an elastomer as a whole and has at least a face which opposes the group of fixed electrodes, said face being made of a conductive elastomer, said movable electrode plate being provided with a protrusion which extends downward and a lower end of which is in contact with a center portion of said group of fixed electrodes of said substrate, wherein
    the group of fixed electrodes and the movable electrode plate are allowed to form a plurality of variable electrostatic capacitive sections, and wherein
    in response to the magnitude and direction of a force applied onto the movable electrode plate, the electrostatic capacitances of the respective variable electrostatic capacitive sections are allowed to change.

11. The electrostatic capacitive touch sensor according to claim 10, wherein the group of fixed electrodes are arranged so as to have an interval of 180° from each other, and wherein, based upon a change in the electrostatic capacitances between the two variable electrostatic capacitive sections, a magnitude in an X-axis direction of a force applied onto the operation portion is detected together with a positive or negative direction thereof.

12. The electrostatic capacitive touch sensor according to claim 10, wherein the substrate and the movable electrode plate are enclosed by a metal frame, and one portion of the metal frame is bent over so that the movable electrode plate and the substrate are secured to the metal frame in a manner so as to be pressed thereon, and wherein foreign matters are prevented from entering the variable electrostatic capacitive section from outside by using a sealing property exerted by the elastic restoration force of the movable electrode plate.

13. The electrostatic capacitive touch sensor according to claim 12, wherein the metal frame has a conductive property so that the movable electrode plate is allowed to hold a predetermined voltage through the metal frame.

14. The electrostatic capacitive touch sensor according to claim 10, wherein the electrodes of the group of fixed electrodes are arranged so as to have an interval of 90° with each other, and wherein,
- based upon a change in the electrostatic capacitances between two variable electrostatic capacitive sections that face each other on one straight line, a magnitude in an X-axis direction of a force applied onto the operation portion is detected together with a positive or negative direction thereof; and
- based upon a change in the electrostatic capacitances between the two variable electrostatic capacitive sections that face each other on the other straight line, a magnitude in a Y-axis direction of a force applied onto the operation portion is detected together with a positive or negative direction thereof.

15. The electrostatic capacitive touch sensor according to claim 14, wherein an independent electrode is formed on a substrate portion surrounded by four electrodes disposed with an interval of 90° with each other, and wherein, based upon a change in the electrostatic capacitance of the variable electrostatic capacitive section that is formed by the independent electrode and the variable electrode plate, a magnitude in a Z-axis direction of a force applied onto the operation portion is detected together with a positive or negative direction thereof.

16. The electrostatic capacitive touch sensor according to claim 10, further comprising an operation portion for transmitting force to said movable electrode plate, said operation portion being made of elastomer, having a protruding shape and being integrally molded with the movable electrode plate.

17. The electrostatic capacitive touch sensor according to claim 16, wherein the operation portion is provided with a space section.

18. The electrostatic capacitive touch sensor according to claim 16, wherein a peripheral protruding portion is formed on the movable electrode plate so as to surround the operation portion, and wherein when the movable electrode plate is attached to a fixing member with the peripheral protruding portion being pressed thereon, a sealing property between the fixing member and the movable electrode plate is secured by the elastic restoration force of the peripheral protruding portion.

19. An electrostatic capacitive touch sensor, comprising:
- a substrate having a group of fixed electrodes formed thereon;
- a movable electrode plate that is molded by using elastomer and has at least a face that opposes the group of fixed electrodes and is made of a conductive elastomer; and
- an operation portion which is made of a hard material, formed integrally with the movable electrode plate or separately from the movable electrode plate and can transmit force to the movable electrode plate, wherein
- the group of fixed electrodes and the movable electrode plate are allowed to form a plurality of variable electrostatic capacitive sections, and wherein
- in response to the magnitude and direction of a force applied onto the movable electrode plate, the electrostatic capacitances of the respective variable electrostatic capacitive sections are allowed to change.

20. The electrostatic capacitive touch sensor according to claim 19, wherein the group of fixed electrodes are arranged so as to have an interval of 180° from each other, and wherein, based upon a change in the electrostatic capacitances between the two variable electrostatic capacitive sections, a magnitude in an X-axis direction of a force applied onto the operation portion is detected together with a positive or negative direction thereof.

21. The electrostatic capacitive touch sensor according to claim 19, wherein a peripheral protruding portion is formed on the movable electrode plate so as to surround the operation portion, and wherein when the movable electrode plate is attached to a fixing member with the peripheral protruding portion being pressed thereon, a sealing property between the fixing member and the movable electrode plate is secured by the elastic restoration force of the peripheral protruding portion.

22. The electrostatic capacitive touch sensor according to claim 19, wherein a protrusion is formed on at least either one of the opposing faces of the substrate and the movable electrode plate so as to prevent the gap between the group of fixed electrodes and the movable electrode plate from becoming too narrow.

23. The electrostatic capacitive touch sensor according to claim 19, wherein the operation portion is made of rubber, resin or metal.

24. The electrostatic capacitive touch sensor according to claim 19, wherein the substrate and the movable electrode plate are enclosed by a metal frame, and one portion of the metal frame is bent over so that the movable electrode plate and the substrate are secured to the metal frame in a manner so as to be pressed thereon, and wherein foreign matters are prevented from entering the variable electrostatic capacitive section from outside by using a sealing property exerted by the elastic restoration force of the movable electrode plate.

25. The electrostatic capacitive touch sensor according to claim 24, wherein the metal frame has a conductive property so that the movable electrode plate is allowed to hold a predetermined voltage through the metal frame.

26. The electrostatic capacitive touch sensor according to claim 19, wherein the electrodes of the group of fixed electrodes are arranged so as to have an interval of 90° with each other, and wherein,
- based upon a change in the electrostatic capacitances between two variable electrostatic capacitive sections that face each other on one straight line, a magnitude in an X-axis direction of a force applied onto the operation portion is detected together with a positive or negative direction thereof; and
- based upon a change in the electrostatic capacitances between the two variable electrostatic capacitive sections that face each other on the other straight line, a magnitude in a Y-axis direction of a force applied onto the operation portion is detected together with a positive or negative direction thereof.

27. The electrostatic capacitive touch sensor according to claim 26, wherein an independent electrode is formed on a substrate portion surrounded by four electrodes disposed with an interval of 90° with each other, and wherein, based upon a change in the electrostatic capacitance of the variable electrostatic capacitive section that is formed by the independent electrode and the variable electrode plate, a magnitude in a Z-axis direction of a force applied onto the operation portion is detected together with and a positive or negative direction thereof.

28. The electrostatic capacitive touch sensor according to claim 27, wherein an independent contact-use land is formed on the substrate portion surrounded by four electrodes disposed with an interval of 90° with each other and a protrusion serving as an electrical contact is formed on a portion of the movable electrode plate opposing the contact-use land, so that a switch is constructed by the protrusion and the contact-use land.

\* \* \* \* \*